United States Patent
Hirokane et al.

(10) Patent No.: US 6,690,625 B2
(45) Date of Patent: Feb. 10, 2004

(54) MAGNETO-OPTICAL RECORDING MEDIUM

(75) Inventors: Junji Hirokane, Nara (JP); Noboru Iwata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 90 days.

(21) Appl. No.: 10/132,837

(22) Filed: Apr. 25, 2002

(65) Prior Publication Data

US 2002/0159339 A1 Oct. 31, 2002

(30) Foreign Application Priority Data

Apr. 27, 2001 (JP) ............................. 2001-133555

(51) Int. Cl.[7] .............................................. G11B 11/00
(52) U.S. Cl. ................. 369/13.38; 369/13.44; 428/694 EC
(58) Field of Search ................. 369/13.38, 13.35, 369/13.39, 13.4, 13.15, 13.42, 13.44, 13.45, 13.49, 13.5; 428/64.3, 694 ML, 694 MM, 694 EC

(56) References Cited

U.S. PATENT DOCUMENTS

| | | | |
|---|---|---|---|
| 5,659,537 A | 8/1997 | Hirokane et al. | 369/275.2 |
| 5,777,953 A | 7/1998 | Hirokane et al. | 369/13 |
| 5,939,187 A | 8/1999 | Hirokane et al. | 428/332 |
| 5,982,715 A | * 11/1999 | Mori et al. | 369/13.38 |
| 6,117,544 A | * 9/2000 | Hirokane et al. | 428/336 |
| 6,147,939 A | * 11/2000 | Takahashi et al. | 369/13.43 |
| 6,278,668 B1 | * 8/2001 | Hirokane et al. | 369/13.4 |
| 6,430,115 B1 | * 8/2002 | Hirokane et al. | 369/13.43 |
| 6,463,016 B1 | * 10/2002 | Hirokane et al. | 369/13.4 |

* cited by examiner

Primary Examiner—Tan Dinh
(74) Attorney, Agent, or Firm—Edwards & Angell, LLP; John J. Penny, Jr.; David G. Conlin

(57) ABSTRACT

A magneto-optical recording medium is provided with at least: a recording layer, made of a perpendicular magnetization film, in which magnetized information is recorded in the form of a perpendicular direction of magnetization; a magnetic flux generating layer, made of a perpendicular magnetization film, which is exchange-coupled with the recording layer; and a read-out layer, having a perpendicular magnetization at a predetermined temperature or higher temperatures than the predetermined temperature, which copies the magnetized information of the recording layer by magneto-static coupling with the magnetic flux generating layer and the recording layer, wherein the magnetic flux generating layer is a magnetic film having a lower Curie temperature than that of the recording layer and having a larger total magnetization than that of the recording layer at a temperature at which the read-out layer has a perpendicular magnetization.

20 Claims, 16 Drawing Sheets

MAGNETO-OPTICAL RECORDING MEDIUM

FIELD OF THE INVENTION

The present invention relates to magneto-optical recording media, such as a magneto-optical disk, a magneto-optical tape, and a magneto-optical card, for use in magneto-optical recording and reproducing devices.

BACKGROUND OF THE INVENTION

One example of a rewritable optical recording medium which has been conventionally put to use is a magneto-optical disk which is realized by a magneto-optical recording medium. In such a magneto-optical recording medium, information is recorded or erased by projecting a converged light beam on the optical recording medium from a semiconductor laser, so as to raise the temperature of a portion of the magneto-optical recording medium irradiated by the laser beam. Reproduction of recorded information is carried out by projecting a converged light beam on the magneto-optical recording medium with such an intensity which is strong enough to reproduce information but not to record or erase information, and by recognizing a polarization state of the reflected light.

However, a problem of such a conventional magneto-optical recording medium is that reproducing characteristics suffer when the size or intervals of recorded bits of magnetic domains become smaller than a spot size of the light beam. This problem is posed when the beam spot of the light beam converged on a target recorded bit also falls on an adjacent recorded bit. As a result, information cannot be reproduced separately from the individual recording bits.

A magneto-optical recording medium which intends to solve the foregoing problem is disclosed in Japanese Unexamined Patent Publication No. 180276/1997 (Tokukaihei 9-180276) (published date: Jul. 11, 1997) (U.S. Pat. No. 5,777,953). The magneto-optical recording medium proposed in this publication includes: a read-out layer which has an in-plane magnetization at room temperature and shifts with rise in temperature to perpendicular magnetization at a critical temperature; a non-magnetic intermediate layer made of a transparent dielectric material; a perpendicular magnetization film; and a recording magnetic layer, which are stacked in this order.

Further, for the purpose of improving reproducing characteristics of this magneto-optical recording medium, Japanese Unexamined Patent Publication No. 320134/1997 (Tokukaihei 9-320134) (published date: Dec. 12, 1997) (U.S. Pat. No. 5,939,187) proposes a magneto-optical recording medium which includes: a read-out layer which has an in-plane magnetization at room temperature and shifts with rise in temperature to perpendicular magnetization at a critical temperature; an in-plane magnetization layer having a Curie temperature in the vicinity of the critical temperature; a non-magnetic layer; a perpendicular magnetization film; and a recording layer for recording information.

Further, Japanese Unexamined Patent Publication No. 180486/1996 (Tokukaihei 8-180486) (published date: Jul. 12, 1996) (U.S. Pat. No. 5,659,537) proposes a magneto-optical recording medium which includes: a read-out layer made of a perpendicular magnetization film; a non-magnetic intermediate layer; a perpendicular magnetization film; and a recording layer for recording information.

In the magneto-optical recording media disclosed in the foregoing publications Tokukaihei 9-180276 and Tokukaihei 9-320134, the read-out layer has an in-plane magnetization until it shifts with rise in temperature to perpendicular magnetization at a critical temperature.

When the read-out layer has an in-plane magnetization, the information of the magnetic domains recorded in the recording layer is not transferred to the read-out layer and the information of the recorded magnetic domains is not reproduced.

At the critical temperature or higher temperature, the read-out layer shifts to perpendicular magnetization and the information of magnetic domains recorded in the recording layer is transferred to the read-out layer to be reproduced. Therefore, as long as the reproducing power of the light beam and the critical temperature at which the read-out layer shifts to perpendicular magnetization are properly set, it is possible to reproduce information separately from individual recorded bits, even when the beam spot of the light beam converged on the read-out layer falls on an adjacent recorded bit. That is, information can be reproduced according to a magnetic super resolution reproducing scheme which enables reproduction of information recorded in high density.

Further, the magneto-optical recording medium disclosed in Tokukaihei 8-180486 realizes magnetic super resolution reproducing by the transfer of magnetized information from the recording layer to the read-out layer which occurs only in a temperature increased portion where a magneto-static coupling force between the two layers has increased by the increased total magnetization of these layers as a result of a temperature increase.

However, despite this advancement, a larger recording capacity is demanded for the optical disk. In order to meet this demand, the recording layer needs to be provided with smaller magnetic domains and transfer these magnetic domains to the read-out layer, so that the information can be stably reproduced.

The recording layers of the magneto-optical recording media disclosed in the foregoing publications Tokukaihei 9-180276, Tokukaihei 9-320134, and Tokukaihei 8-180486 are all magnetic layers which have a compensation temperature in the vicinity of room temperature. Further, the magnetic layers of these publications, in addition to recording and carrying information, serve to generate a leakage magnetic flux for transferring the information of magnetic domains recorded in the recording layer to the read-out layer when reproducing information.

The Curie temperature of the recording layer is set to around 250° C. to save recording power. However, in order to reduce cross-light from an adjacent track, the compensation temperature of the recording layer is preferably set to around 50° C. to 100° C. or higher temperatures to maximize the coercive force in the vicinity of the Curie temperature.

However, the increased compensation temperature with a fixed Curie temperature reduces a total magnetization of the recording layer as the compensation temperature is increased. This results in smaller leakage magnetic flux from the recording layer and thus weaker magneto-static coupling force between the recording layer and the read-out layer. This causes the problem of instable transfer of a magnetized state. Therefore, in a super resolution magneto-optical recording medium in which the read-out layer and the recording layer are magnetostatically coupled, it is difficult with the use of the recording layer alone to realize desirable recording characteristics with reduced cross-light, and a stable magneto-statical coupling state at the same time.

SUMMARY OF THE INVENTION

An object of the present invention is to reduce cross-light from an adjacent track and to stably copy a magnetized state.

In order to achieve this object, a magneto-optical recording medium according to the present invention at least includes: a recording layer, made of a perpendicular magnetization film, in which magnetized information is recorded in the form of a perpendicular direction of magnetization; a magnetic flux generating layer, made of a perpendicular magnetization film, which is exchange-coupled with the recording layer; and a read-out layer, having a perpendicular magnetization at a predetermined temperature or higher temperatures, which copies the magnetized information of the recording layer by magneto-static coupling with the magnetic flux generating layer and the recording layer, wherein the magnetic flux generating layer is a magnetic film having a lower Curie temperature than that of the recording layer and having a larger total magnetization than that of the recording layer at a temperature at which the read-out layer has a perpendicular magnetization.

According to this arrangement, the function of generating a leakage magnetic flux for magneto-static coupling with the read-out layer and the function of recording information, which have been conventionally performed by the recording layer alone, can be rendered separately to the magnetic flux generating layer and the recording layer, respectively. This enables the recording layer to have a high compensation temperature (preferably 50° C. to 100° C., or higher) so as to increase the coercive force in the vicinity of the Curie temperature. As a result, the adverse effect of cross-light from an adjacent track can be alleviated. Further, according to the foregoing arrangement, a large magnetic flux can be generated from the magnetic flux generating layer having a larger total magnetization than that of the recording layer at temperatures at which the read-out layer has a perpendicular magnetization. As a result, the magneto-static coupling force with the read-out layer can be increased to realize stable transfer of magnetized information.

Here, it is required that the magnetic flux generating layer has a lower Curie temperature than the recording layer because recording of information would otherwise be determined by the magnetic flux generating layer with the higher Curie temperature. In this case, information cannot be recorded accurately because the magnetic flux generating layer has a relatively low compensation temperature for successful magneto-static coupling with the read-out layer and therefore gradually loses its coercive force toward the Curie temperature.

With the foregoing arrangement, however, the compensation temperature of the recording layer can be increased to increase the coercive force and thereby alleviate the adverse effect of cross-light from an adjacent track, while ensuring stable and accurate transfer of magnetized information (magnetized state).

For a fuller understanding of the nature and advantages of the invention, reference should be made to the ensuing detailed description taken in conjunction with the accompanying drawings.

DESCRIPTION OF THE EMBODIMENTS

[First Embodiment]

The following will describe one embodiment of the present invention with reference to FIG. 1 through FIG. 10, and FIG. 19.

Figure 1:
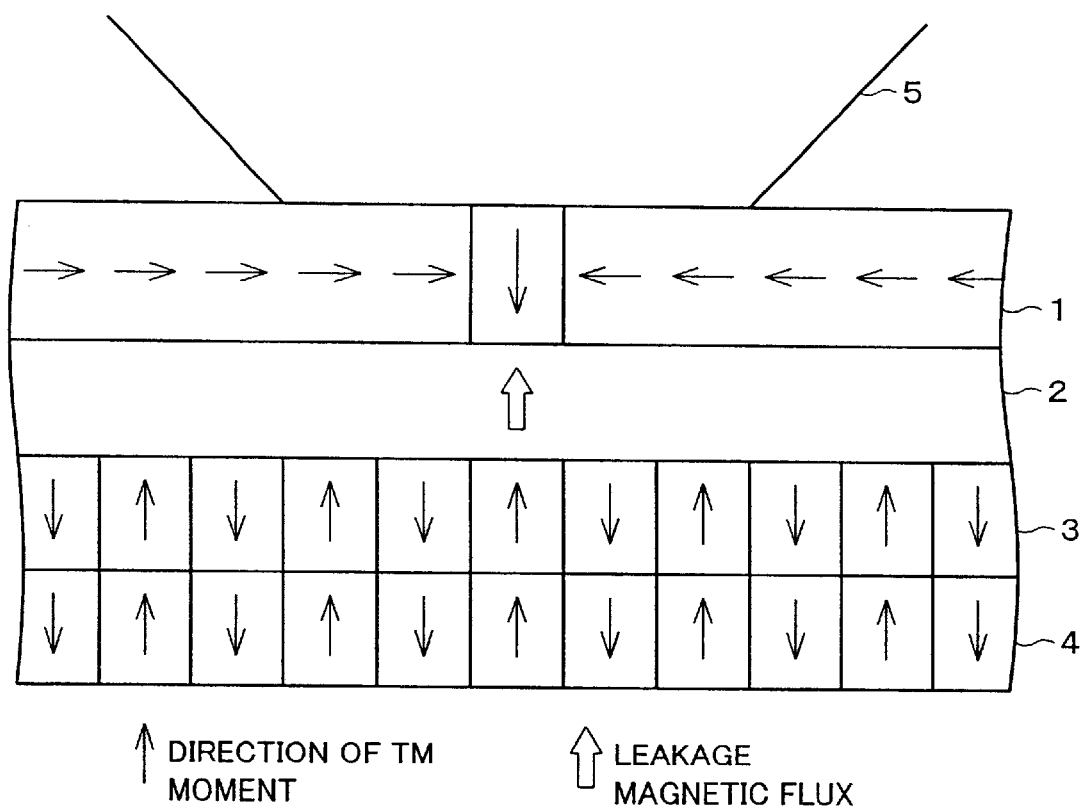
FIG. 1 is an explanatory drawing of a super resolution magneto-optical recording medium according to one embodiment of the present invention, in which a magnetized state of the medium is shown in cross section to explain a reproducing principle thereof.

FIG. 1 is a drawing of a super resolution magneto-optical recording medium (first super resolution magneto-optical recording medium) provided as a magneto-optical recording medium according to the present embodiment, in which a magnetized state of the medium is shown in cross section to explain a reproducing principle thereof.

The super resolution magneto-optical recording medium according to the present embodiment includes, as shown in FIG. 1, a read-out layer 1 (read-out magnetic layer), a non-magnetic intermediate layer 2, a magnetic flux generating layer 3, and a recording layer 4 (recording magnetic layer) in which information is recorded, which are successively stacked in this order.

The read-out layer 1 is a magnetic layer made of rare earth transition metal alloy and has an in-plane magnetization at room temperature and shifts to perpendicular magnetization with rise in temperature.

More specifically, the compensation composition of the read-out layer 1 is such that the RE (rare earth) moment becomes larger than the TM (transition) moment, i.e., RE rich composition, where the sub-lattice moment of the RE metal is equal to the sub-lattice moment of the TM metal at room temperature. The in-plane magnetization of the read-out layer 1 becomes perpendicular magnetization in a temperature raised portion which has reached a predetermined temperature, i.e., a critical temperature, as shown in FIG. 1. The composition of the read-out layer 1 is, for example, GdFeCo, which is an RE rich composition.

The magnetic flux generating layer 3 and the recording layer 4 are stacked adjacent to each other by exchange coupling. Between the read-out layer 1 and the magnetic flux generating layer 3 are provided the non-magnetic intermediate layer 2. The read-out layer 1 is magneto-statically coupled with the magnetic flux generating layer 3 and the recording layer 4 via the non-magnetic intermediate layer 2. The non-magnetic intermediate layer 2 is provided to realize this magneto-static coupling.

By the provision of the non-magnetic intermediate layer 2, the read-out layer 1 can be more stably coupled, i.e., magneto-statically coupled with the magnetic flux generating layer 3 and the recording layer 4, thus realizing stable magnetic super resolution reproductions.

In this super resolution magnetic recording medium, a leakage magnetic flux generated from the magnetic flux generating layer 3 becomes magneto-statically coupled with the perpendicular magnetization of the read-out layer 1 so as to copy the magnetized state, i.e., magnetized information (recorded magnetic domain information) of the recording layer 4 to the read-out layer 1. This is magnetic super resolution reproduction in which only the magnetized information of a temperature raised portion which has reached the critical temperature or higher temperatures by irradiation of a light beam 5 is reproduced.

In this case, because the composition of the read-out layer 1 is RE rich, the total magnetization and the TM moment therein are in opposite direction. Therefore, the perpendicular magnetization of a portion of the read-out layer 1 raised to a temperature at or above the critical temperature by localized irradiation of the light beam 5 is magneto-statically coupled in such a manner that the TM moment in this temperature-raised portion of the read-out layer 1 is in the opposite direction to the leakage magnetic flux.

Figure 19:
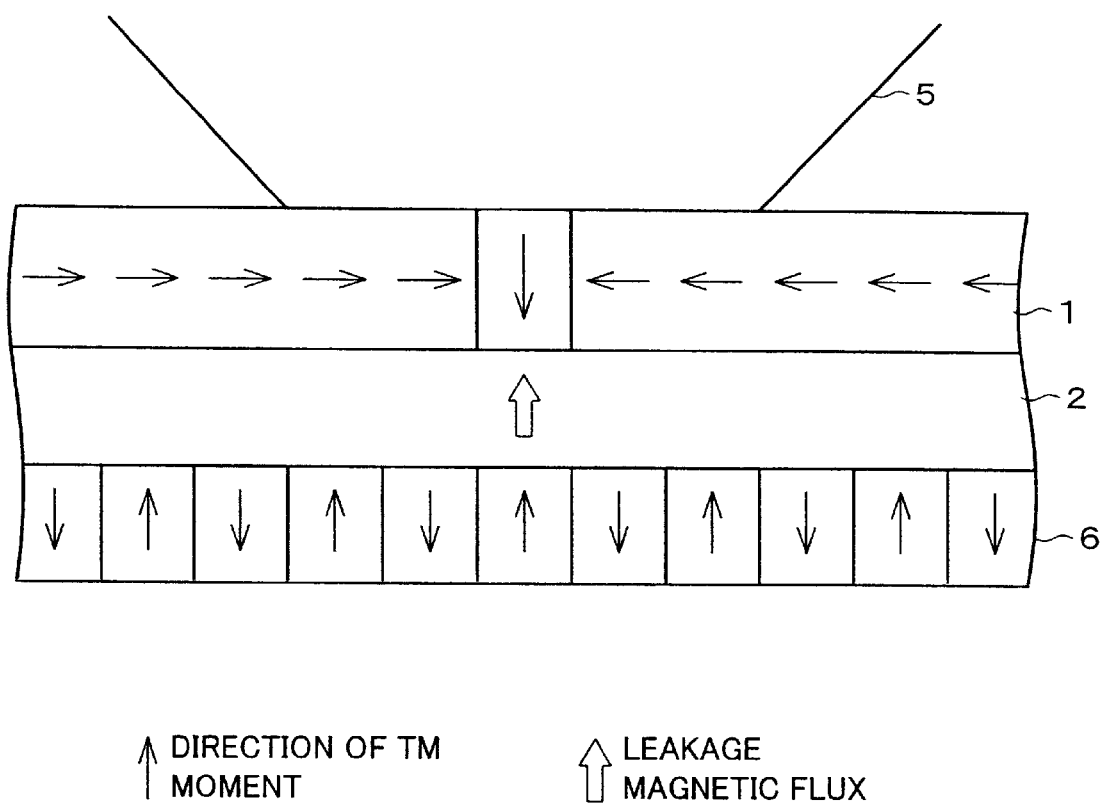
FIG. 19 is an explanatory drawing of a super resolution magneto-optical recording medium of a conventional example, in which a magnetized state of the medium is shown in cross section to explain a reproducing principle thereof.

The following describes a reproducing principle of a conventional super resolution magneto-optical recording medium, which is one example of a conventional magneto-optical recording medium, with reference to FIG. 19 which shows a magnetized state of the medium in cross section.

The super resolution magneto-optical recording medium shown in FIG. 19 has a read-out layer 1 and a non-magnetic intermediate layer 2 which use the same magnetic film as that used in the super resolution magneto-optical recording medium according to the present embodiment. Instead of the magnetic flux generating layer 3 and the recording layer 4, the super resolution magneto-optical recording medium of FIG. 19 is provided with a recording layer 6 which serves to generate a leakage magnetic flux for magneto-static coupling and to record information.

Therefore, the recording layer 6 of this conventional super resolution magneto-optical recording medium needs to generate a leakage magnetic flux which is suitable for realizing stable magneto-static coupling with the read-out layer 1, while at the same time having desirable recording characteristics.

The following explains magnetic characteristics of the recording layer of the super resolution magneto-optical recording medium.

Figure 2:
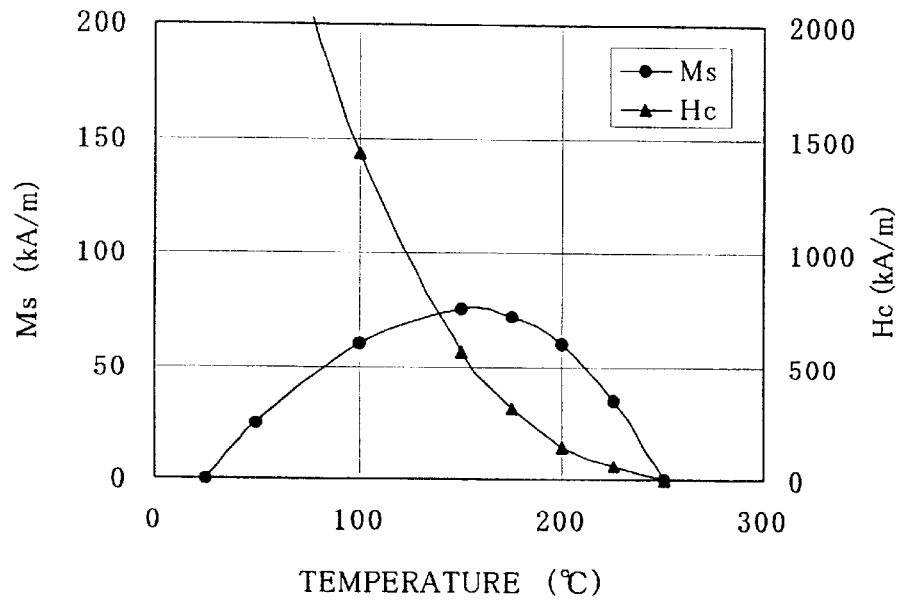
FIG. 2 is a graph showing temperature dependence of total magnetization Ms and coercive force Hc of a recording layer of $Tb_{0.24}(Fe_{0.85}Co_{0.15})_{0.76}$ having a thickness of 40 nm.

FIG. 2 is a graph showing one example of magnetic characteristics of the recording layer of the super resolution magneto-optical recording medium. More specifically, it is a graph showing temperature dependence of total magnetization Ms and coercive force Hc of a 40 nm thick recording layer of a composition $Tb_{0.24}(Fe_{0.85}Co_{0.15})_{0.76}$.

The recording layer of the foregoing constitution has a compensation temperature at 25° C. and coercive force Hc which decreases with increase in temperature and becomes zero at a Curie point of 250° C. In a magnetic domain which is recorded according to light modulated recording or magnetic filed modulated recording, coercive force Hc is increased with decrease in temperature to stably maintain the recorded magnetic domain. In either recording method, in response to the increased temperature by the converged light beam, the direction of magnetization of an area in which the coercive force Hc became smaller than the intensity of the recording magnetic field is aligned with the direction of the recording magnetic field to record information. However, since the decrease of coercive force Hc in response to temperature increase is gradual, the magnetic domains are recorded in a great wide variety of sizes when there is a fluctuation of recording magnetic field intensity or a fluctuation of medium temperature due to fluctuating laser power. In this case, information cannot be recorded or reproduced accurately.

One way to solve such a problem in the conventional magneto-optical recording medium which is provided with the recording layer 6 instead of the magnetic flux generating layer 3 and the recording layer 4 is to increase the compensation temperature of the recording layer 6 so that the coercive force Hc decreases steeply toward the Curie temperature.

The compensation temperature of the recording layer can be increased by increasing the Tb content.

Figure 3:
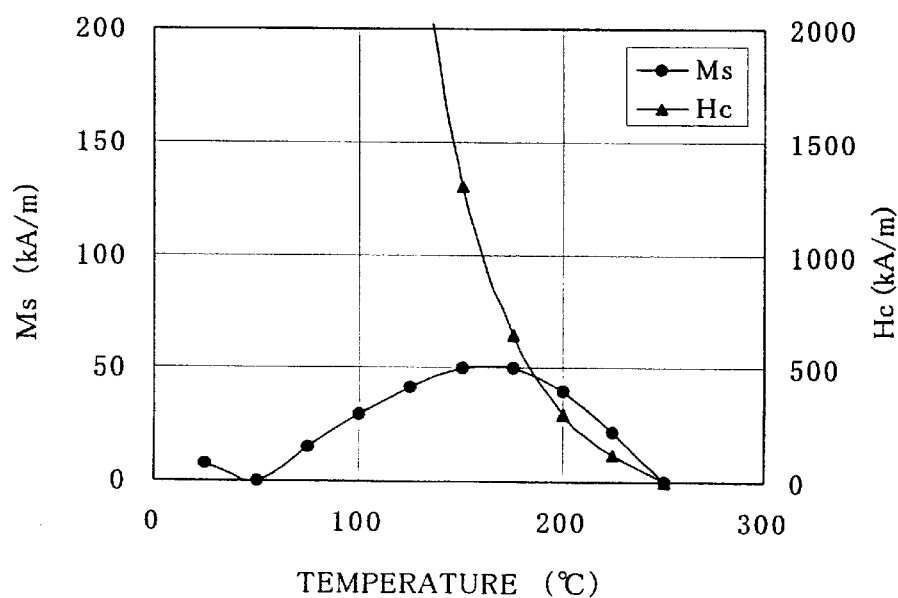
FIG. 3 is a graph showing temperature dependence of total magnetization Ms and coercive force Hc of a recording layer of $Tb_{0.25}(Fe_{0.83}Co_{0.17})_{0.75}$ having a thickness of 40 nm.
Figure 4:
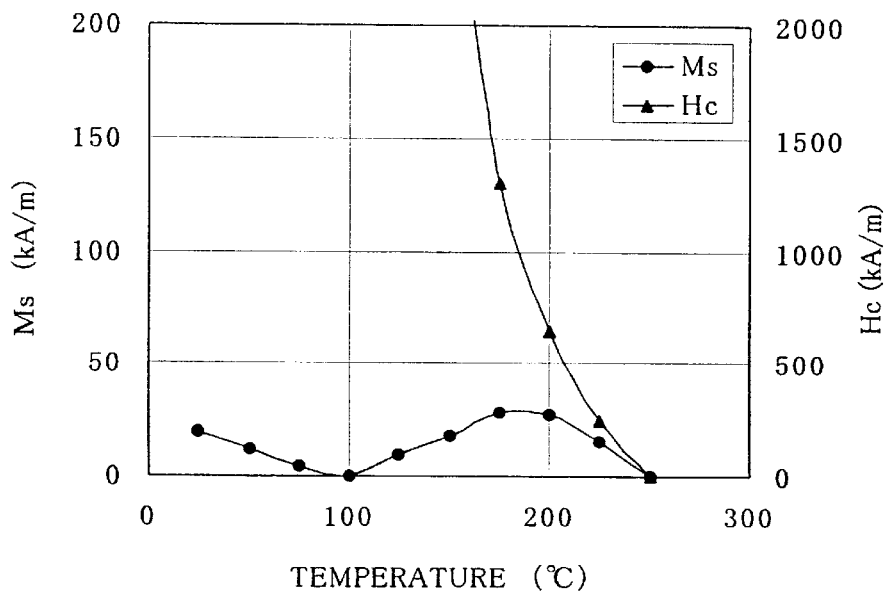
FIG. 4 is a graph showing temperature dependence of total magnetization Ms and coercive force Hc of a recording layer of $Tb_{0.26}(Fe_{0.81}Co_{0.19})_{0.74}$ having a thickness of 40 nm.

FIG. 3 is a graph which shows another example of recording characteristics of the recording layer of the super resolution magneto-optical recording medium. More specifically, it is a graph showing temperature dependence of total magnetization Ms and coercive force Hc of a 40 nm thick recording layer of a composition $Tb_{0.25}(Fe_{0.83}Co_{0.17})_{0.75}$ having a higher Tb content than that of the recording layer of $Tb_{0.24}(Fe_{0.85}Co_{0.15})_{0.76}$ shown in FIG. 2. Further, FIG. 4 is a graph which shows yet another example of recording characteristics of the recording layer of the super resolution magneto-optical recording medium. More specifically, it is a graph showing temperature dependence of total magnetization Ms and coercive force Hc of a 40 nm thick recording layer of a composition $Tb_{0.26}(Fe_{0.81}Co_{0.19})_{0.74}$ having a higher Tb content than that of the recording layer of $Tb_{0.24}(Fe_{0.85}Co_{0.15})_{0.76}$ shown in FIG. 2. The compensation temperatures are 50° C. and 100° C. in FIG. 3 and FIG. 4, respectively. Note that, FIG. 3 and FIG. 4 have different proportions of Fe and Co to accommodate the higher Tb content, so that the Curie temperature is at 250° C. as it is for FIG. 2.

The Tb content is increased in this manner to increase the compensation temperature so that the coercive force Hc can decrease steeply toward the Curie temperature. As a result, information can be recorded and reproduced more accurately even in the presence of disturbances such as the fluctuations of various factors as noted above.

However, since the foregoing conventional super resolution magneto-optical recording medium transfers and reproduces magnetized information by the magneto-static coupling between the recording layer 6 and the read-out layer 1, it is required to maximize the leakage magnetic flux generated from the recording layer 6.

Yet, an attempt to improve recording characteristics by increasing the compensation temperature with a fixed Curie temperature results in a gradual decrease of the maximum value of total magnetization Ms as the compensation temperature is increased, as shown in FIG. 3 and FIG. 4. Further, since the leakage magnetic flux generated from the recording layer decreases proportionally with increase in magnitude of total magnetization Ms, a higher compensation temperature results in a weaker leakage magnetic flux required for magneto-static coupling.

It can be seen from this account that the compensation temperature cannot be increased with a fixed Curie temperature to improve recording characteristics because it weakens the magneto-static coupling between the recording layer 6 and the read-out layer 1 to cause the problem of instable reproduction.

One way to increase the strength of the magneto-static coupling between the recording layer 6 and the read-out layer 1 to realize stable reproduction is to lower the compensation temperature to increase the total magnetization Ms of the recording layer 6. This can be achieved by reducing the Tb content.

Figure 5:
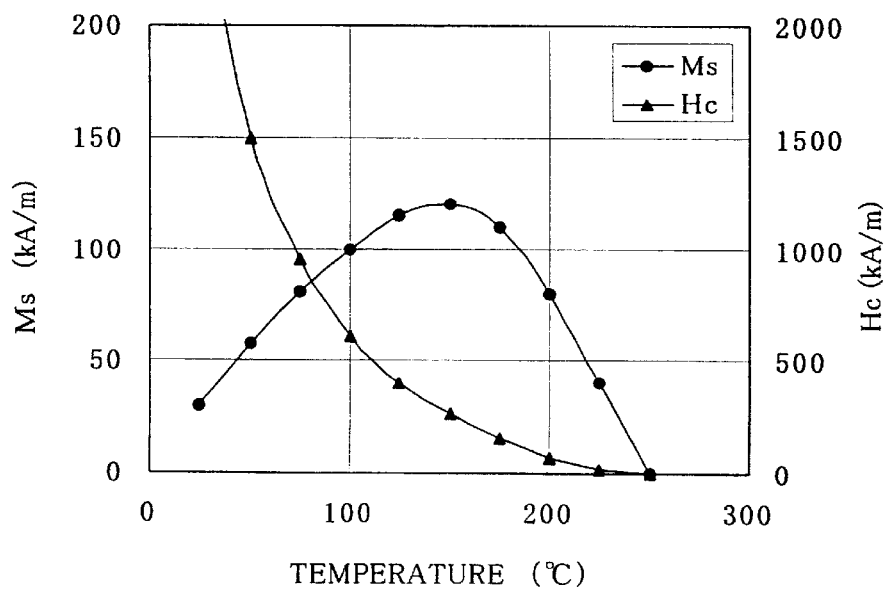
FIG. 5 is a graph showing temperature dependence of a peak value of total magnetization Ms and coercive force Hc of a recording layer of $Tb_{0.23}(Fe_{0.87}Co_{0.13})_{0.77}$ having a thickness of 40 nm.

FIG. 5 is a graph which shows still another example of recording characteristics of the recording layer of the super resolution magneto-optical recording medium. More specifically, it is a graph showing temperature dependence of a peak value of total magnetization Ms and coercive force Hc of a 40 nm thick recording layer of a composition $Tb_{0.23}(Fe_{0.87}Co_{0.13})_{0.77}$ having a lower Tb content, contrary to FIG. 3 and FIG. 4, than that of the recording layer of $Tb_{0.24}(Fe_{0.85}Co_{0.15})_{0.76}$ shown in FIG. 2.

By thus lowering the Tb content, the total magnetization Ms can be increased to increase the strength of the magneto-static coupling between the recording layer 6 and the read-out layer 1 and thereby realize stable reproduction.

However, another problem is posed in this case in that the decrease of coercive force Hc toward the Curie temperature becomes gradual and information cannot be accurately recorded.

Thus, with the recording layer 6 of FIG. 19 which is solely used to generate a leakage magnetic flux for magneto-static coupling and to record information, it is impossible to stably reproduce information, that is, to stably transfer a magnetized state and to accurately record information.

On the other hand, the super resolution magneto-optical recording medium shown in FIG. 1 according to the present embodiment includes, instead of the recording layer 6, a stacked recording member of a bi-layered structure composed of (1) the magnetic flux generating layer 3 for realizing stable magneto-static coupling with the read-out layer 1 and (2) the recording layer 4 for realizing accurate recording. Therefore, it is to be appreciated that, with such a stacked recording member, stable reproduction and accurate recording of information are possible.

That is, stable reproduction of information is possible because the magnetic flux generating layer 3 is made of a magnetic film with a relatively low compensation temperature and a large total magnetization Ms to increase the strength of magneto-static coupling with the read-out layer 1. Accurate recording is possible because the recording layer 4 is made of a magnetic film with a relatively high compensation temperature and with such a characteristic that the coercive force Hc decreases steeply toward the Curie temperature.

It should be noted here that recording operations of the super resolution magneto-optical recording medium having the foregoing arrangement are determined by the magnetic flux generating layer 3 when the Curie temperature of this layer is higher than that of the recording layer 4. In this case, accurate recording will not be carried out because the magnetic flux generating layer 3 has a relatively low compensation temperature and shows a gradual decrease of coercive force Hc toward the Curie temperature. It is therefore required that the Curie temperature of the magnetic flux generating layer 3 be lower than the Curie temperature of the recording layer 4.

Figure 6:
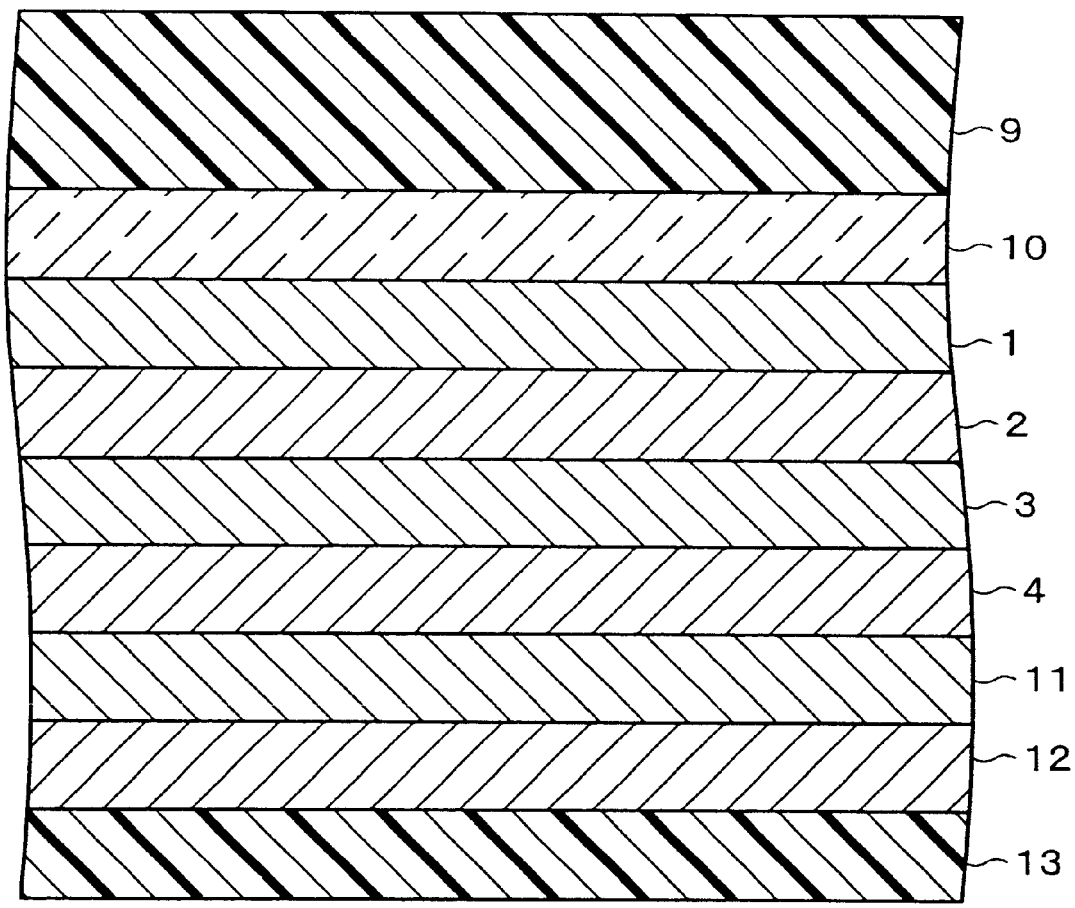
FIG. 6 is a cross sectional view showing a construction of a super resolution magneto-optical disk according to one embodiment of the present invention.

Referring to FIG. 6, the following will explain one application of the super resolution magneto-optical recording medium according to the present embodiment as a magneto-optical disk.

FIG. 6 is a cross section of a super resolution magneto-optical disk which is realized by the super resolution magneto-optical recording medium of the present embodiment.

A super resolution magneto-optical disk (first super resolution magneto-optical disk) according to the present embodiment has a disk main body which includes a substrate 9, a transparent dielectric layer 10, a read-out layer 1, a non-magnetic intermediate layer 2, a magnetic flux generating layer 3, a recording layer 4, a protective layer 11, a heat dissipation layer 12, and an overcoat layer 13, which are stacked in this order.

The recording method used in the magneto-optical disk is a Curie temperature recording method in which information is reproduced according to a magneto-optical effect known as the polar Kerr effect. According to this recording method, the light beam 5 from a semiconductor laser is focused on the read-out layer 1 through an objective lens. The polar Kerr effect refers to a phenomenon in which the direction of rotation of a polarization plane of the reflected light is reversed by the direction of magnetization perpendicular to the light incident surface. Further, in the Curie temperature recording method, information is recorded in the recording layer 4 by applying a magnetic field under a temperature condition in which the recording layer 4 is heated as closely as possible to the Curie temperature, preferably to a temperature within ±30° C. of the Curie temperature, or more preferably within ±5° C. of the Curie temperature.

The substrate 9, which has the shape of the disk, is made of a transparent material such as polycarbonate, for example.

The transparent dielectric layer 10 is preferably made of a material which does not contain oxygen, examples of which include AlN, SiN, and AlSiN. The thickness of the transparent dielectric layer 10 needs to be set so that desirable interference effect can be obtained for the incoming laser light and the Kerr rotation angle of the super resolution magneto-optical recording medium can be increased. To this end, the thickness of the transparent dielectric layer 10 is set to satisfy ($\lambda$/4n), where $\lambda$ is the wavelength of the reproducing light, and n is the refractive index of the transparent dielectric layer 10. For example, when the wavelength of the laser light is 680 nm, the thickness of the transparent dielectric layer 10 is set to be not less than 40 nm and not more than 100 nm.

The read-out layer 1 is a magnetic film of amorphous thin films made of rare earth transition metal alloy. The composition of the read-out layer 1 is adjusted to have such magnetic characteristics that the magnetization state, which is in-plane magnetization at room temperature, shifts to perpendicular magnetization at the critical temperature with temperature increase, as described above. Other than GdFeCo, the material of the read-out layer 1 may be GdDyFeCo or GdTbFeCo, for example.

The read-out layer 1 shifts to perpendicular magnetization when heated and is magneto-statically coupled with the magnetic flux generating layer 3 and the recording layer 4 to copy the magnetization of the recording layer 4. That is, information is reproduced as a result of a change in magnetization state of the read-out layer 1 to perpendicular magnetization, and the perpendicular magnetization of the read-out layer 1 is brought about at a reproducing temperature for reproducing information. Therefore, the critical temperature is the temperature at which information is reproduced, and the critical temperature of the read-out layer 1 is preferably not less than 100° C. and not more than 200° C.

A critical temperature below 100° C. causes the read-out layer 1 to shift to perpendicular magnetization with a small temperature increase, with a result that the reproducing characteristics become instable with respect to a change in surrounding temperature. On the other hand, a critical temperature higher than 200° C. is in the vicinity of the Curie temperature of the recording layer 4, which makes it difficult to provide enough power margin for reproduction.

The thickness of the read-out layer 1 is preferably in the range of from 10 nm to 80 nm, inclusive. A thickness of the read-out layer 1 below 10 nm reduces the quantity of reflected light from the read-out layer 1, and accordingly the intensity of the read-out signal becomes markedly weak. In addition, because the magnetized information of the magnetic flux generating layer 3 is reproduced by the light beam 5 which has passed through the read-out layer 1, resolution of reproduction is lowered. On the other hand, with a thickness of the read-out layer 1 above 80 nm, recording sensitivity deteriorates considerably due to the increased thickness.

The non-magnetic intermediate layer 2 is made of a dielectric material such as AlN, SiN, or AlSiN. Alternatively, a non-magnetic metal such as Al, Ti, or Ta, or an alloy of such metals may be used. The thickness of the non-magnetic intermediate layer 2 is set to be not less than 0.5 nm and not more than 60 nm so as to allow for stable magneto-static coupling between the read-out layer 1 and the magnetic flux generating layer 3. A thickness of the non-magnetic intermediate layer 2 less than 0.5 nm fails to continuously form the non-magnetic intermediate layer 2, and the magneto-static coupling becomes instable. On the other hand, a thickness of the non-magnetic intermediate layer 2 more than 60 nm separates the magnetic flux generating layer 3 from the read-out layer 1, and the magneto-static coupling again becomes instable. Thus, the distance between the magnetic flux generating layer 3 and the read-out layer 1 is preferably not more than 60 nm.

The magnetic flux generating layer 3 is made of a perpendicular magnetization film made of rare earth transition metal alloy. The magnetic flux generating layer 3 needs to have a higher Curie temperature than the recording layer 4. Further, the total magnetization Ms of the magnetic flux generating layer 3 needs to be larger than that of the recording layer 4 in a temperature range of reproduction, i.e., in a temperature range in which the read-out layer 1 has a perpendicular magnetization, particularly in the vicinity of the critical temperature of the read-out layer 1.

This is because accurate recording otherwise fails due to the fact that the magnetic flux generating layer 3 determines recording operations when the Curie temperature of the magnetic flux generating layer 3 is higher than that of the recording layer 4, and that the magnetic flux generating layer 3 gradually loses its coercive force Hc toward the Curie temperature due to its relatively low compensation temperature. Another problem is caused when the magnetic flux generating layer 3 and the recording layer 4 have the same Curie temperature. In this case, the exchange coupling force which acts between the two magnetic layers causes the magnetic characteristics of the magnetic flux generating layer 3 to have influence on the magnetic characteristics of the recording layer 4. As a result, the coercive force of the recording layer 4 becomes weaker in a temperature range of not more than the Curie temperature.

The Curie temperature of the magnetic flux generating layer 3 needs to be set such that the recorded state is decided according to the magnetic characteristics of the recording layer 4. At least, the Curie temperature of the magnetic flux generating layer 3 needs to be lower than that of the recording layer 4. Preferably, the Curie temperature of the magnetic flux generating layer 3 is in the range of from 180° C. to 240°, inclusive.

Further, in the present invention, the total magnetization Ms of the magnetic flux generating layer 3 at a temperature at which the read-out layer 1 has a perpendicular magnetization, i.e., a reproducing temperature for reproducing magnetized information, is larger than the total magnetization Ms of the recording layer 4 at the reproducing temperature, so that the magnetic flux generating layer 3 acts to generate the leakage magnetic flux for the magneto-static coupling with the read-out layer 1. In this way, the magnetic flux generating layer 3, having a larger total magnetization Ms than that of the recording layer 4, generates a larger leakage magnetic flux to increase the magneto-static coupling force on the read-out layer 1, thereby stably transferring magnetized information.

To this end, the composition of the magnetic flux generating layer 3 is so adjusted that the Curie temperature is lower than that of the recording layer 4, and the total magnetization Ms is larger than that of the recording layer 4 at a temperature at which the read-out layer 1 has a perpendicular magnetization, particularly in the vicinity of a temperature at or above the critical temperature. In addition, the magnetic flux generating layer 3 has a lower compensation temperature than the recording layer 4. More specifically, the composition of the magnetic flux generating layer 3 is adjusted to have a larger total magnetization Ms than that of the recording layer 4 in a temperature range of, for example, preferably from the critical temperature to the temperature 50° C. higher than the critical temperature, or more preferably from the critical temperature to the temperature 5° C. higher than the critical temperature.

Further, in order to realize stable transfer of magnetized information by generating a larger leakage magnetic flux for the magneto-static coupling with the read-out layer 1, the composition of the magnetic flux generating layer 3 is so adjusted that the maximum value (peak value) of the total magnetization Ms of the magnetic flux generating layer 3 is larger than the maximum value (peak value) of the total magnetization Ms of the recording layer 4.

Further, the compensation temperature of the magnetic flux generating layer 3 is preferably in the range of from −100° C. to 50° C., inclusive. A compensation temperature below −100° C. causes the magnetic flux generating layer 3 to generate an excessively large leakage magnetic flux at around room temperature to lower resolution of reproduction. On the other hand, at a compensation temperature above 50° C., the total magnetization Ms of the magnetic flux generating layer 3 becomes excessively small in a temperature range in which the read-out layer 1 has a perpendicular magnetization. As a result, the magneto-static coupling state becomes instable.

The magnetic flux generating layer 3 may be made of, for example, TbFeCo, DyFeCo, or HoFeCo.

The magnetic flux generating layer 3 has a thickness in the range of from 20 nm to 80 nm, inclusive. A thickness of the magnetic flux generating layer 3 below 20 nm reduces the leakage magnetic flux generated from the magnetic flux generating layer 3, with a result that the magneto-static coupling state becomes instable. On the other hand, a thickness of the magnetic flux generating layer 3 above 80 nm has a detrimental effect on recording sensitivity due to the increased thickness.

The recording layer 4 is made of a perpendicular magnetization film of rare earth transition metal alloy. The compensation temperature of the recording layer 4 is preferably in the range of from 50° C. to 150° C., inclusive, to ensure desirable recording characteristics. The Curie temperature of the recording layer 4 is preferably in the range of from 230° C. to 280° C., inclusive, to ensure practical recording sensitivity. The recording layer 4 is preferably made of a material with a relatively large perpendicular magnetization anisotropy value, for example, such as TbFeCo.

The thickness of the recording layer 4 is preferably from 10 nm to 40 nm, inclusive. A thickness of the recording layer 4 less than 10 nm is too thin in comparison with the magnetic flux generating layer 3, and the influence of magnetic characteristics the magnetic flux generating layer 3 has on the recording layer 4 by exchange coupling becomes relatively strong. As a result, recording characteristics suffer. On the other hand, a thickness of the recording layer 4 more than 40 nm has a detrimental effect on recording sensitivity due to the increased total thickness.

The protective layer 11 is made of a dielectric material such as AlN, SiN, AlSiN, or alternatively non-magnetic metal alloy which contains, for example, Al, Ti, or Ta. The protective layer 11 is provided to prevent oxidation of the rare earth transition metal alloy used in the read-out layer 1 and in the recording layer 4. The thickness of the protective layer 11 is within the range of from 2 nm to 60 nm, inclusive.

The heat dissipation layer 12 is made of metal with high heat conductivity such as Ag or Au, or metal alloy with high heat conductivity such as AgTi, AgAl, or AuTi. The heat dissipation layer 12 is provided to improve heat dissipation of the super resolution magneto-optical recording medium to obtain desirable recording and reproducing characteristics. The thickness of the heat dissipation layer 12 is within the range of from 5 nm to 60 nm, inclusive.

The heat dissipation layer 12 dissipates excess heat which has accumulated, for example, by a reduced spot size, from 0.5 $\mu$m to 0.6 $\mu$m, of the light beam when a semiconductor laser of a short wavelength of around 410 nm is used. Thus, the heat dissipation layer 12 will not be necessary when a red semiconductor laser of a longer wavelength is used and when the spot size of the light beam is about 1 $\mu$m. Further, the heat dissipation layer 12 may be provided in the absence of the protective layer 11, or the protective layer 11 may be provided after forming the heat dissipation layer 12. Without the heat dissipation layer 12, the protective layer 11 must be provided to prevent degradation, e.g., oxidation, of the recording layer 4.

The overcoat layer 13 is formed by applying a UV curable resin or a heat curable resin by spin coating, followed by irradiation of UV light or heating.

Note that, the foregoing described the case where the super resolution magneto-optical disk had a construction in which the read-out layer 1, the non-magnetic intermediate layer 2, the magnetic flux generating layer 3, and the recording layer 4 are stacked in this order. However, these layers may be provided in different order in the present invention. For example, the read-out layer 1, the non-magnetic intermediate layer 2, the recording layer 4, and the magnetic flux generating layer 3 may be disposed in this order. However, because strong magneto-static coupling is required between the read-out layer 1 and the magnetic flux generating layer 3, it is preferable to stack the read-out layer 1, the non-magnetic intermediate layer 2, the magnetic flux generating layer 3, and the recording layer 4 in this order, so that the read-out layer 1 and the magnetic flux generating layer 3 are provided close to each other.

The following describes specific examples of a process for forming the magneto-optical disk having the foregoing construction, i.e., the super resolution magneto-optical disk according to the present embodiment, along with recording and reproducing characteristics of the disk.

EXAMPLE 1

(1) A Process of Forming the Magneto-Optical Disk

First, a process of forming the super resolution magneto-optical disk having the foregoing construction is described. A disk-shaped polycarbonate substrate 9 capable of land/groove recording on a 0.35 $\mu$m wide spiral land/groove recording area was prepared. The substrate 9 was then placed on a substrate holder inside a sputtering device equipped with an Al target, a GdFeCo alloy target, a TbFeCo alloy target, a TbFeCo alloy target, and an AgTi target.

Then, a mixture of argon gas and nitrogen gas was drawn into the sputtering device which had been evacuated to $1.33 \times 10^{-4}$ Pa, and power was supplied to the Al target to form a transparent dielectric layer 10 of AlN in a thickness of 60 nm on the substrate 9 under a gas pressure of 0.532 Pa.

Thereafter, the sputtering device was evacuated again to $1.33 \times 10^{-4}$ Pa, and argon gas was drawn into the sputtering device. Subsequently, power was supplied to the GdFeCo alloy target to form a read-out layer 1 of $Gd_{0.30}(Fe_{0.80}Co_{0.20})_{0.70}$ in a thickness of 40 nm on the transparent dielectric layer 10 under a gas pressure of 0.532 Pa.

The read-out layer 1 had such characteristics that the magnetization state of the read-out layer 1, which is in-plane magnetization at room temperature, shifted to perpendicular magnetization at 110° C. Further, the read-out layer 1 had a Curie temperature of 300° C. without a compensation temperature. The composition of the read-out layer 1 was RE rich in the temperature range of from room temperature to the Curie temperature.

Thereafter, a mixture of argon gas and nitrogen gas was drawn into the sputtering device, and power was supplied to the Al target to form a non-magnetic intermediate layer 2 of AlN in a thickness of 5 nm on the read-out layer 1 under a gas pressure of 0.532 Pa.

Figure 7:
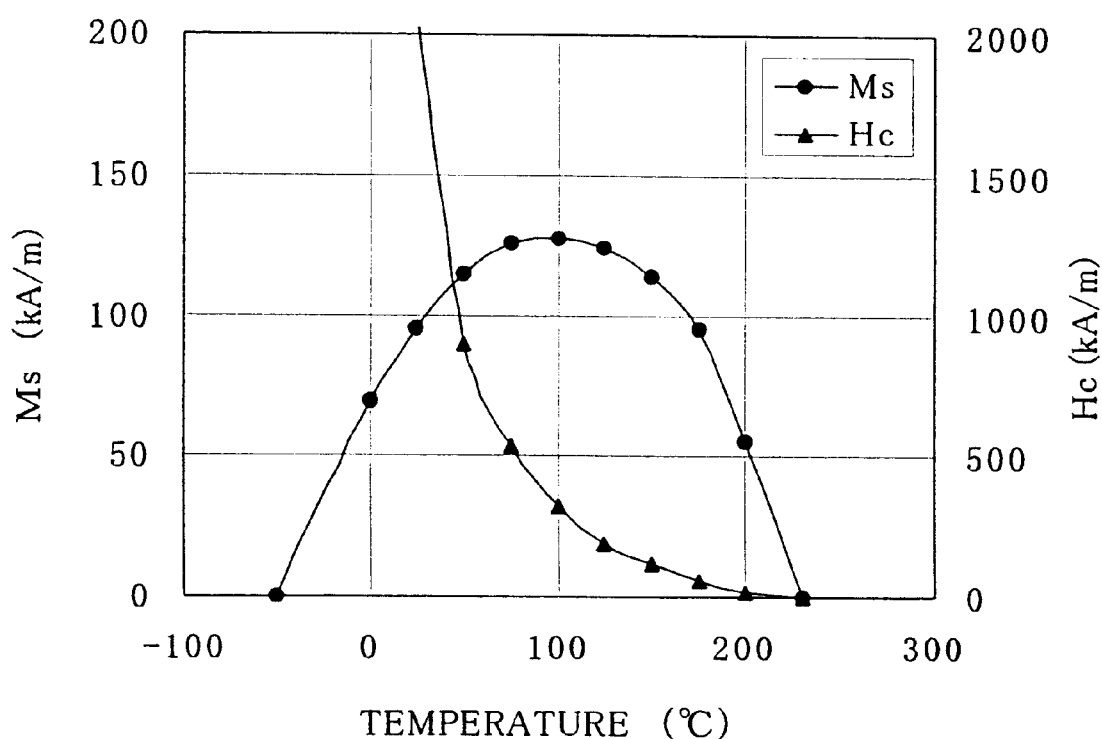
FIG. 7 is a graph showing magnetic characteristics of a magnetic flux generating layer of $Tb_{0.21}(Fe_{0.90}Co_{0.10})_{0.79}$ having a thickness of 30 nm.

The sputtering device was evacuated again to $1.33 \times 10^{-4}$ Pa, and power was supplied to the TbFeCo alloy target to form a magnetic flux generating layer 3 of $Tb_{0.21}(Fe_{0.90}Co_{0.10})_{0.79}$ in a thickness of 30 nm on the non-magnetic intermediate layer 2 under a gas pressure of 0.532 Pa. The magnetic flux generating layer 3 had a compensation temperature of −50° C. and a Curie temperature of 230° C. FIG. 7 shows magnetic characteristics of the magnetic flux generating layer 3.

Subsequently, power was supplied to the TbFeCo alloy target to form a recording layer 4 of $Tb_{0.26}(Fe_{0.81}Co_{0.19})_{0.74}$ in a thickness of 30 nm on the magnetic flux generating film 3 under a gas pressure of 0.532 Pa. The recording layer 4 had a compensation temperature of 100° C. and a Curie temperature of 250° C. FIG. 4 shows magnetic characteristics of the recording layer 4.

By comparing FIG. 7 and FIG. 4, it can be seen that the magnetic flux generating layer 3 of this Example has a large total magnetization Ms of 100 kA/m or greater in the vicinity of the critical temperature of the read-out layer 1 at 110° C. It is therefore possible to obtain strong magneto-static coupling and stable reproducing characteristics.

Thereafter, a mixture of argon gas and nitrogen gas was drawn into the sputtering device, and power was supplied to the Al target to form a protective layer 11 of AlN in a thickness of 5 nm on the recording layer 4 under a gas pressure of 0.532 Pa.

Subsequently, argon gas was drawn into the sputtering device, and power was supplied to the AgTi target to form a heat dissipation layer 11 of $Ag_{0.85}Ti_{0.15}$ in a thickness of 20 nm on the protective layer 11 under a gas pressure of 0.532 Pa.

Finally, an overcoat layer 13 was formed on the heat dissipation layer 12 by applying a UV curable resin thereon and by subsequent irradiation of UV light.

(2) Recording and Reproducing Characteristics

Figure 8:
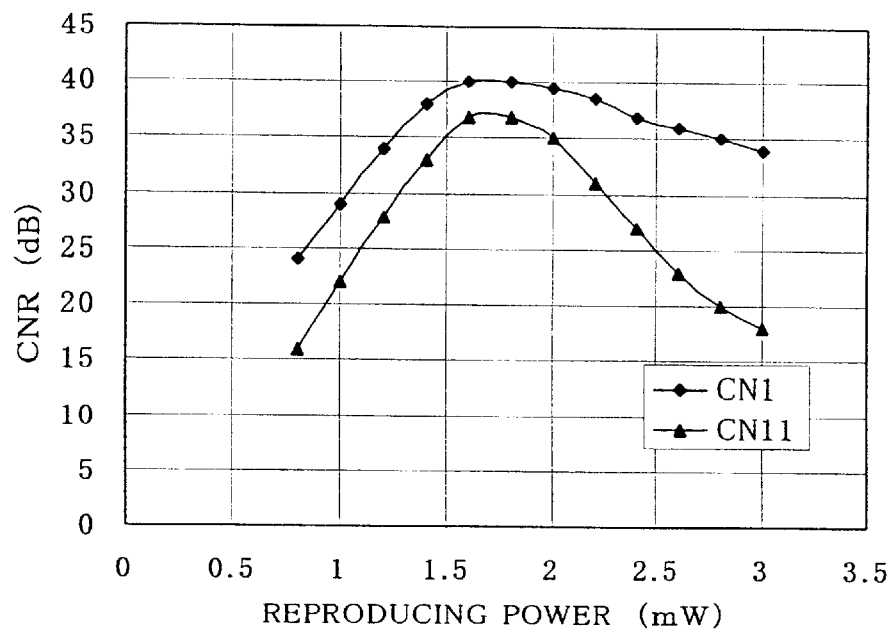
FIG. 8 is a graph showing reproducing power dependence of CNR of super resolution magneto-optical disks of Example 1 and Comparative Example 1.

Using a test device provided with an optical pickup equipped with a semiconductor laser (λ=410 nm) and an objective lens (Numerical Aperture NA=0.65), recurring magnetic domains of 0.20 μm mark long were recorded in the land recording area of the product super resolution magneto-optical disk under optimum recording power and at a linear velocity of 5 m/s and a magnetic field strength of 20 kA/m. FIG. 8 shows reproducing power dependence of CNR (Carrier-to-Noise Ratio) when these magnetic domains were reproduced. In FIG. 8, CN1 indicates the CNR of this Example 1.

Here, the mark length of 0.20 μm refers to each length of the magnetic domains which are recurrently recorded with a pitch (0.40 μm) twice the distance of the mark length.

[Comparative Example 1]

(1) A Process of Forming the Magneto-Optical Disk

The process of Example 1 was used to prepare the conventional super resolution magneto-optical disk shown in FIG. 19 as a comparative example, in which a recording layer 6 of $Tb_{0.24}(Fe_{0.85}Co_{0.15})_{0.76}$, 60 nm thick, was provided instead of the magnetic flux generating layer 3 and the recording layer 4. The super resolution magneto-optical disk of this comparative example had a compensation temperature of 25° C. and a Curie temperature of 250° C., and the same magnetic characteristic as the recording layer 6 of $Tb_{0.24}(Fe_{0.85}Co_{0.15})_{0.76}$ of 40 nm thick shown in FIG. 2.

(2) Recording and Reproducing Characteristics

The test device of Example 1 was used to record recurring magnetic domains of 0.20 μm mark long in the land recording area of the product super resolution magneto-optical disk of this comparative example. FIG. 8 shows reproducing power dependence of CNR when these magnetic domains were reproduced. In FIG. 8, CN11 indicates the CNR of this Comparative Example 1.

As the plots of CN1 (Example 1) and CN11 (Comparative Example 1) indicate, the super resolution reproduction increases the CNR (CN1, CN11) with increase in reproducing power which shifts the magnetization state of the read-out layer 1 from in-plane magnetization to perpendicular magnetization, as shown in FIG. 8. Further, in CN1 and CN11, the CNR became maximum in the vicinity of a reproducing power at 1.7 mW. However, there was a 3 dB difference between the maximum CNR of CN1, which was 40 dB, and the maximum CNR of CN11, which was 37 dB. One plausible explanation for this difference is a difference in behavior of the magnetic flux generating layer 3 of CN1 and the recording layer 6 of CN11 in response to the increased reproducing power, whereby the former steeply loses its coercive force to allow accurate recording of extremely short magnetic domains of 0.20 μm, whereas the latter loses its coercive force gradually to prevent accurate recording.

Further, as is clear from FIG. 7, the magnetic flux generating layer 3 of the super resolution magneto-optical disk of Example 1 has a relatively large total magnetization Ms in the vicinity of room temperature (25° C.). This is the reason why the CNR of CN1 starts increasing at a lower reproducing power than does the CNR of CN11, as shown in FIG. 8.

Further, it can be seen from FIG. 8 that a further increase of the reproducing power (e.g., increment of 2 mW or greater) from the maximum power to give the maximum CNR is responded by an abrupt decrease in CN11, contrary to CN1 which responds to this increase only by a slight decrease. This is due to a difference in magnitude of the total magnetization Ms between the magnetic flux generating layer 3 of the super resolution magneto-optical disk of Example 1 and the recording layer 6 of Comparative Example 1 at the critical temperature (110° C.) at which the magnetization state of the read-out layer 1 shifts to perpendicular magnetization, wherein the total magnetization Ms of the former is 130 kA/m, which is relatively large, and that of the latter is 70 kA/m, which is relatively small. Stable reproductions are possible in Example 1 even at a high reproducing power because the magneto-static coupling is strong. On the other hand, stable reproduction cannot be carried out in Comparative Example 1 because of the weak magneto-static coupling. Therefore, it can be seen from the result shown in FIG. 8 that a higher CNR and a wider power margin can be obtained in Example 1 as opposed to Comparative Example 1.

Example 1 thus demonstrates that strong magneto-static coupling and therefore stable reproducing characteristics can be obtained when the magnetic flux generating layer 3 and the recording layer 4 are related to each other as shown in FIG. 7 and FIG. 4, respectively, and when the magnetic flux generating layer 3 has a large total magnetization Ms of 100 kA/m or greater particularly at a temperature in the vicinity of the critical temperature of the read-out layer 1 at 110° C. Further, Example 1 demonstrates that the super resolution magneto-optical disk according to the present embodiment can alleviate the adverse effect of cross-light from an adjacent track, when the foregoing relationship is satisfied, with the use of the recording layer 4 which has a high compensation temperature and a coercive force Hc which decreases abruptly toward the Curie temperature as shown in FIG. 4.

EXAMPLE 2

(1) A Process of Forming the Magneto-Optical Disk

The process of Example 1 was used to prepare a super resolution magneto-optical disk which differs from its counterpart of Example 1 only by a magnetic flux generating layer 3 of $Dy_{0.20}(Fe_{0.85}Co_{0.15})_{0.80}$ of 30 nm thick.

Figure 9:
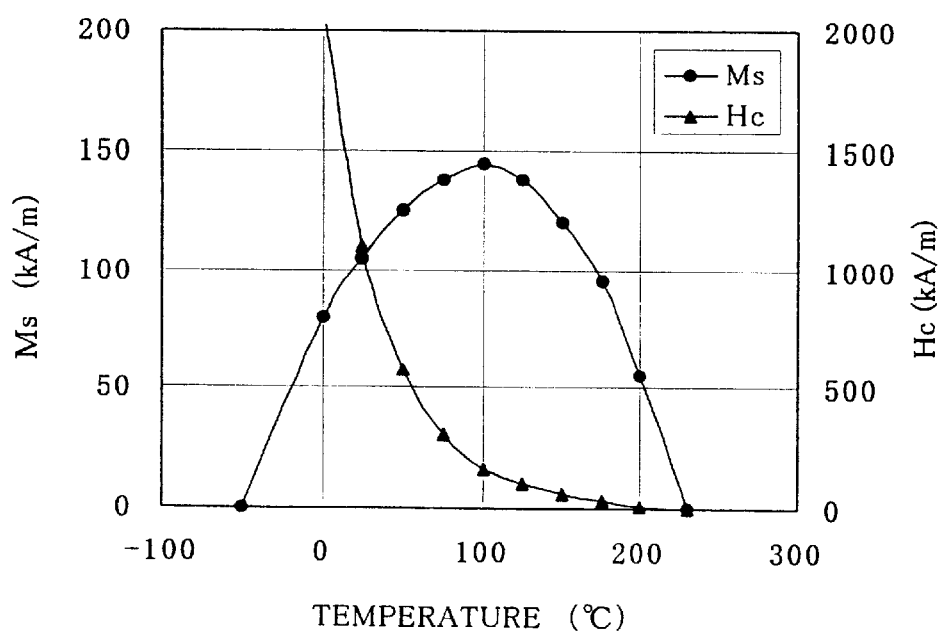
FIG. 9 is a graph showing magnetic characteristics of a magnetic flux generating layer of $Dy_{0.20}(Fe_{0.85}Co_{0.15})_{0.80}$ having a thickness of 30 nm.

FIG. 9 shows magnetic characteristics of this magnetic flux generating layer 3. The composition of this magnetic flux generating layer 3 containing DyFeCo (hereinafter referred to simply as "DyFeCo magnetic flux generating layer 3") is adjusted so that the DyFeCo magnetic flux generating layer 3 has the same compensation temperature (−50° C.) and the same Curie temperature (230° C.) as the magnetic flux generating layer 3 of Example 1, i.e., magnetic flux generating layer 3 containing TbFeCo (hereinafter referred to simply as "TbFeCo magnetic flux generating layer 3").

Here, the maximum value 128 kA/m of the total magnetization Ms of the TbFeCo magnetic flux generating layer 3 of Example 1 shown in FIG. 7 contrasts to the maximum value 145 kA/m of the total magnetization Ms of the DyFeCo magnetic flux generating layer 3 of Example 2 shown in FIG. 9. It can be seen from this that the magneto-static coupling in Example 2 is stronger than that of Example 1.

(2) Recording and Reproducing Characteristics

Figure 10:
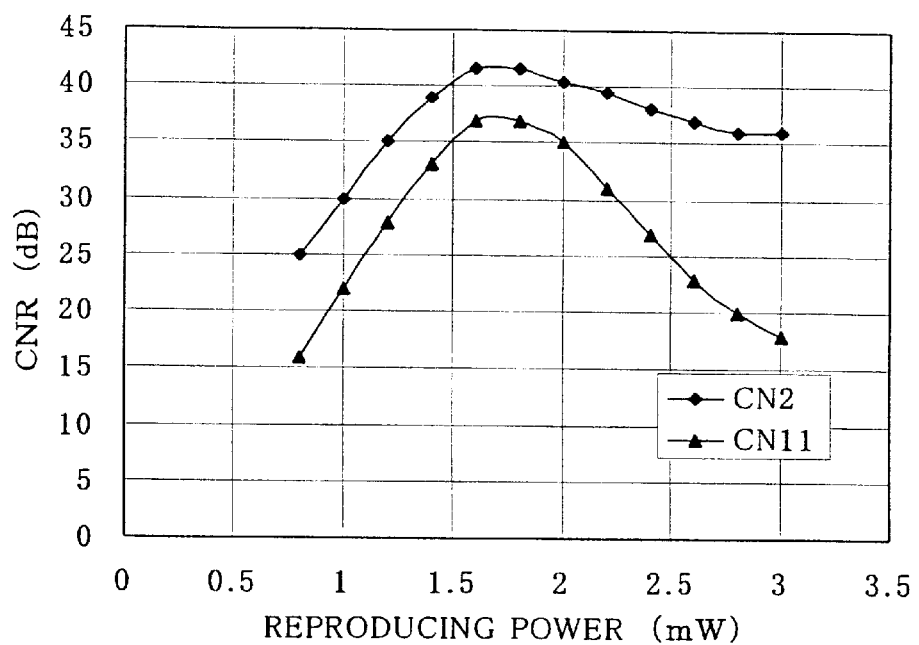
FIG. 10 is a graph showing reproducing power dependence of CNR of super resolution magneto-optical disks of Example 2 and Comparative Example 1.

The test device of Example 1 was used to record recurring magnetic domains of 0.20 μm mark long in the land recording area of the product super resolution magneto-optical disk of Example 2. FIG. 10 shows reproducing power dependence of CNR when these magnetic domains are reproduced. For comparison, FIG. 10 also shows the result of measurement of Comparative Example 1. In FIG. 10, CN2 indicates the CNR of Example 2, and CN11 indicates the CNR of Comparative Example 1.

As can be seen from FIG. 10, a larger CNR and a wider reproducing power margin can be obtained in CN2 as opposed to CN11, as it is for CN1. A comparison of CN1 with CN2 indicates that the maximum CNR of CN2, which is 41.5 dB, is larger than that of CN1, which is 40 dB. This is probably due to the fact that the maximum total magnetization Ms (peak value of the total magnetization Ms) of the DyFeCo magnetic flux generating layer 3 of Example 2 is larger than the maximum total magnetization Ms (peak value of the total magnetization Ms) of the TbFeCo magnetic flux generating layer 3 of Example 1, which has increased the strength of magneto-static coupling to realize more stable reproduction in Example 2 than in Example 1.

Therefore, it can be seen from the result shown in FIG. 10 that a larger CNR and a wider reproducing power margin can be obtained in Example 2 as opposed to Example 1, not to mention Comparative Example 1.

Example 2 thus demonstrates that strong magneto-static coupling and therefore stable reproducing characteristics can be obtained when the magnetic flux generating layer 3 and the recording layer 4 are related to each other as shown in FIG. 9 and FIG. 4, respectively, and when the magnetic flux generating layer 3 has a large total magnetization Ms of 100 kA/m or greater particularly at a temperature in the vicinity of the critical temperature of the read-out layer 1 at 110° C. Further, Example 2 demonstrates that the super resolution magneto-optical disk according to the present embodiment can alleviate the adverse effect of cross-light from an adjacent track, when the foregoing relationship is satisfied, with the use of the recording layer 4 which has a high compensation temperature and a coercive force Hc which decreases abruptly toward the Curie temperature as shown in FIG. 4.

EXAMPLE 3

(1) A Process of Forming the Magneto-Optical Disk

The process of Example 1 was used to prepare a super resolution magneto-optical disk which differs from its counterpart of Example 1 only by a magnetic flux generating layer 3 of $Ho_{0.20}(Fe_{0.75}Co_{0.25})_{0.80}$ of 30 nm thick.

Figure 11:
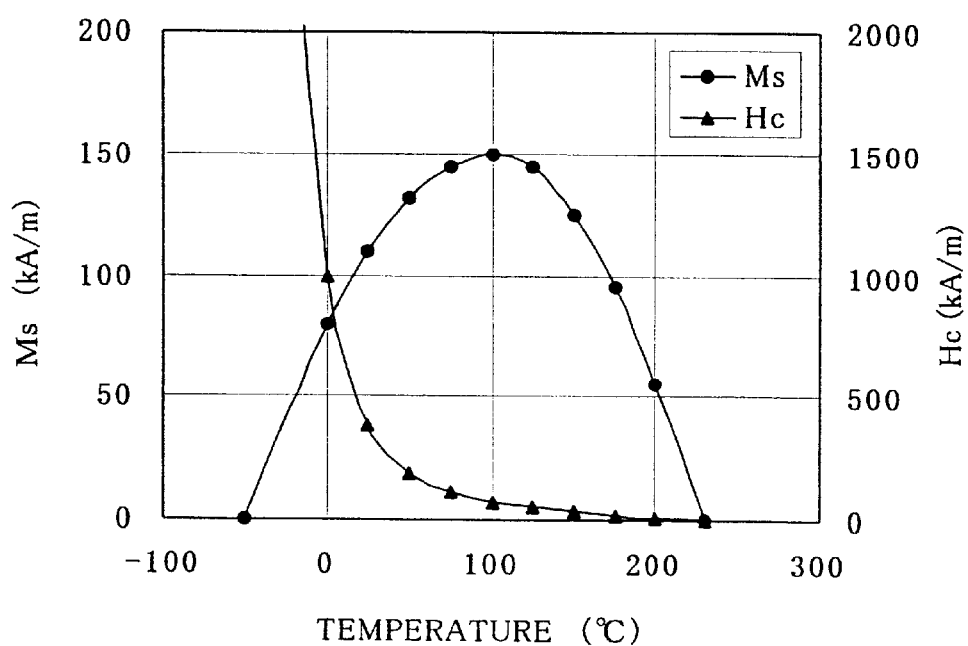
FIG. 11 is a graph showing magnetic characteristics of a magnetic flux generating layer of $Ho_{0.20}(Fe_{0.75}Co_{0.25})_{0.80}$ having a thickness of 30 nm.

FIG. 11 shows magnetic characteristics of this magnetic flux generating layer 3. The composition of this magnetic flux generating layer 3 containing HoFeCo (hereinafter referred to simply as "HoFeCo magnetic flux generating layer 3") is adjusted to have the same compensation temperature (−50° C.) and the same Curie temperature (230° C.) as the TbFeCo magnetic flux generating layer 3 of Example 1.

Figure 17:
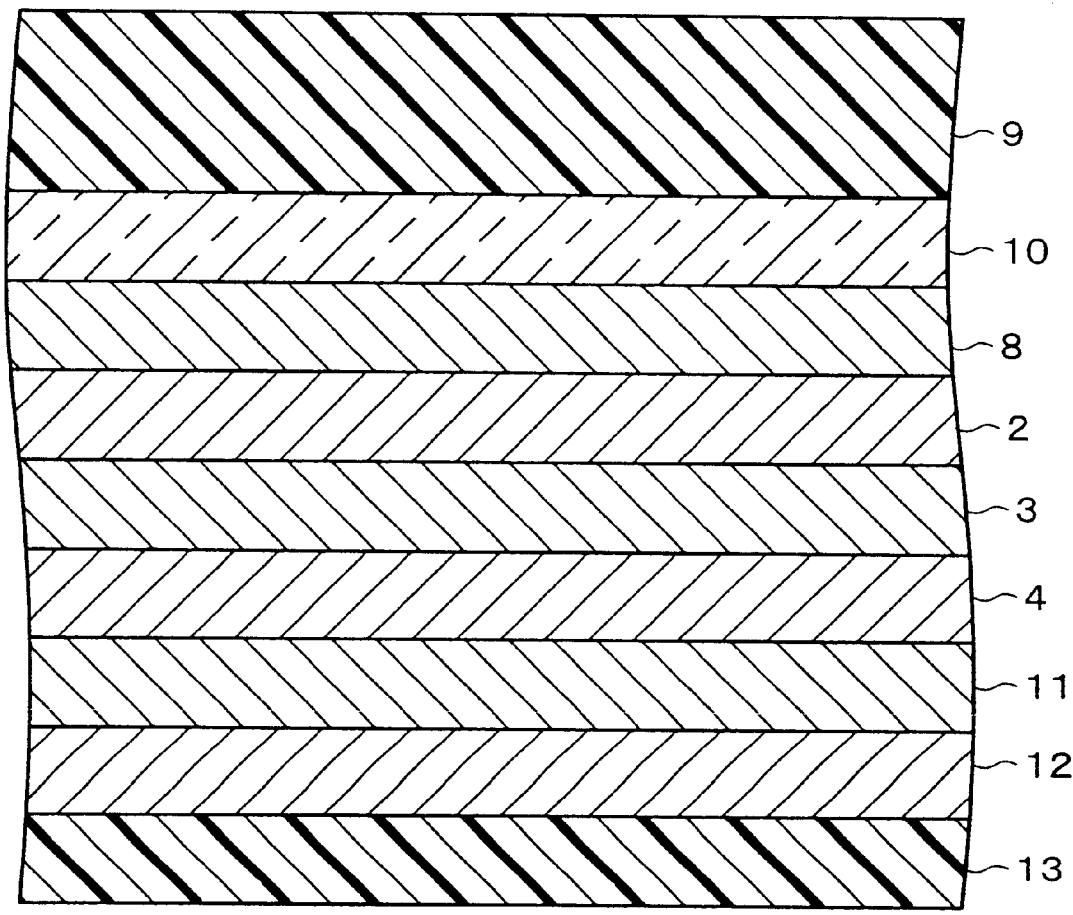
FIG. 17 is a cross sectional view showing a construction of a super resolution magneto-optical disk according to yet another embodiment of the present invention.

Here, the maximum value 128 kA/m of the total magnetization Ms of the TbFeCo magnetic flux generating layer 3 of Example 1 shown in FIG. 17 contrasts to the maximum value 150 kA/m of the total magnetization Ms of the HoFeCo magnetic flux generating layer 3 of Example 3 shown in FIG. 11. It can be seen from this that the magneto-static coupling in Example 3 is stronger than that of Example 1.

(2) Recording and Reproducing Characteristics

Figure 12:
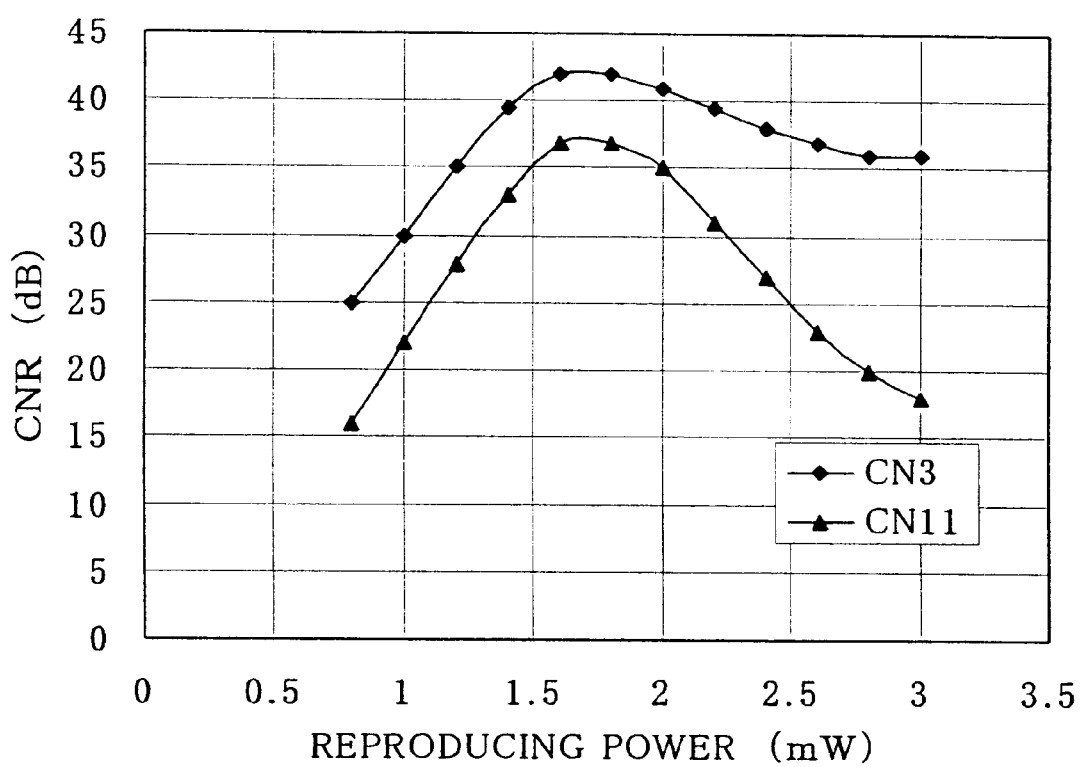
FIG. 12 is a graph showing reproducing power dependence of CNR of super resolution magneto-optical disks of Example 3 and Comparative Example 1.

The test device of Example 1 was used to record recurring magnetic domains of 0.20 μm mark long in the land recording area of the product super resolution magneto-optical disk of Example 3. FIG. 12 shows reproducing power dependence of CNR when these magnetic domains are reproduced. For comparison, FIG. 12 also shows the result of measurement of Comparative Example 1. In FIG. 12, CN3 indicates the CNR of Example 3, and CN11 indicates the CNR of Comparative Example 1.

As can be seen from FIG. 12, a larger CNR and a wider reproducing power margin can be obtained in CN3 as opposed to CN11, as it is for CN1. A comparison of CN1 with CN3 indicates that the maximum CNR of CN3, which is 42.0 dB, is larger than that of CN1, which is 40 dB. This is probably due to the fact that the maximum total magnetization Ms (peak value of the total magnetization Ms) of the HoFeCo magnetic flux generating layer 3 of Example 3 is larger than the maximum total magnetization Ms (peak value of the total magnetization Ms) of the TbFeCo magnetic flux generating layer 3 of Example 1, which has increased the strength of magneto-static coupling to realize more stable reproduction in Example 3 than in Example 1.

Example 3 thus demonstrates that strong magneto-static coupling and therefore stable reproducing characteristics can be obtained when the magnetic flux generating layer 3 and the recording layer 4 are related to each other as shown in FIG. 11 and FIG. 4, respectively, and when the magnetic flux generating layer 3 has a large total magnetization Ms of 100 kA/m or greater particularly at a temperature in the vicinity of the critical temperature of the read-out layer 1 at 110° C. Further, Example 3 demonstrates that the super resolution magneto-optical disk according to the present embodiment can alleviate the adverse effect of cross-light from an adjacent track, when the foregoing relationship is satisfied, with the use of the recording layer 4 which has a high compensation temperature and a coercive force Hc which decreases abruptly toward the Curie temperature as shown in FIG. 4.

Note that, the present embodiment described the case where the magnetic flux generating layer 3 is made of TbFeCo in Example 1, DyFeCo in Example 2, and HoFeCo in Example 3. However, the present embodiment is not just limited to these examples, and it is also possible to use mixtures of these materials, for example, such as TbDyFeCo, TbHoFeCo, or DyHoFeCo, for the magnetic flux generating layer 3.

[Second Embodiment]

The following will describe another embodiment of the present invention with reference to FIG. 1, FIG. 6, FIG. 8, and FIG. 13 through FIG. 15. Note that, constituting elements having the same functions as those described in the First Embodiment are given the same reference numerals and explanations thereof are omitted here. Only the differences from the First Embodiment will be explained in the Second Embodiment.

Figure 13:
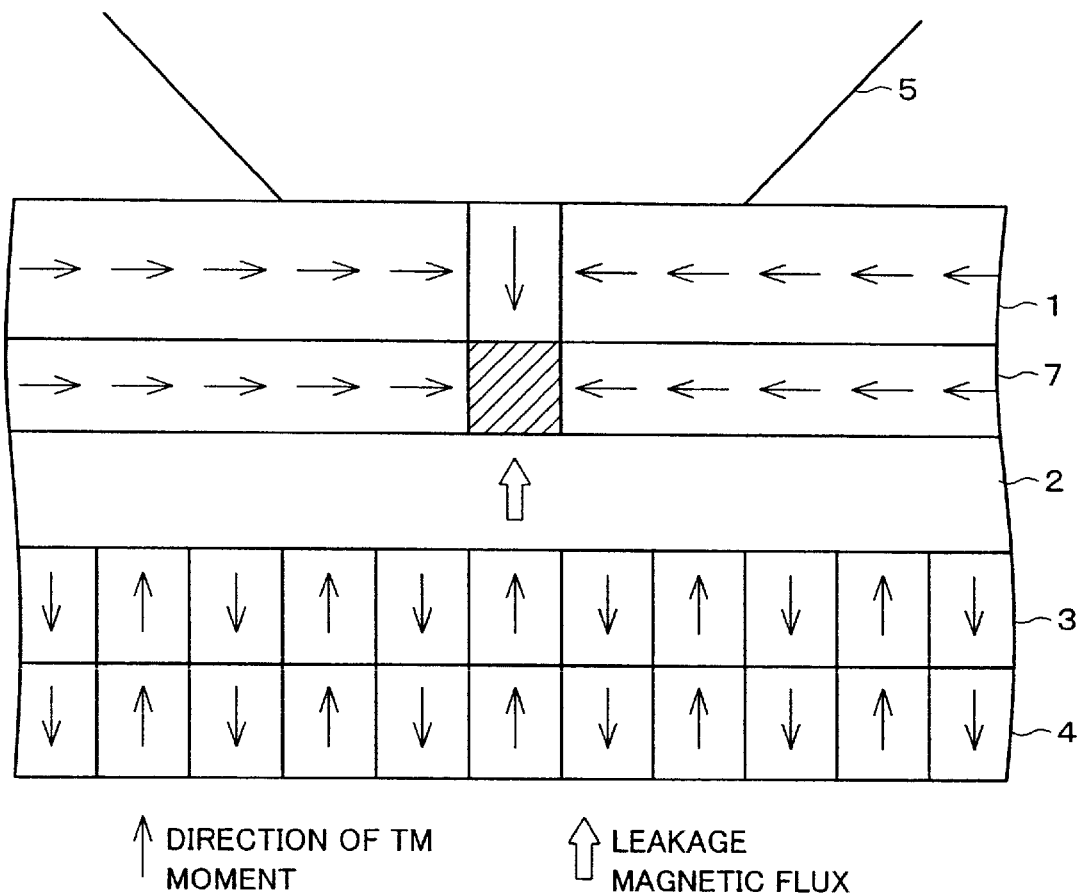
FIG. 13 is an explanatory drawing of a super resolution magneto-optical recording medium according to another embodiment of the present invention, in which a magnetized state of the medium is shown in cross section to explain a reproducing principle thereof.

FIG. 13 is a drawing of a super resolution magneto-optical recording medium (second super resolution magneto-optical recording medium) provided as a magneto-optical recording medium according to the present embodiment, in which a magnetized state of the medium is shown in cross section to explain a reproducing principle thereof.

The super resolution magneto-optical recording medium according to the present embodiment includes, as shown in FIG. 13, a read-out layer 1 (read-out magnetic layer), an in-plane magnetization layer 7, a non-magnetic intermediate layer 2, a magnetic flux generating layer 3, and a recording layer 4 (recording magnetic layer), which are stacked successively in this order. That is, the super resolution magneto-optical recording medium according to the present embodiment is provided with the in-plane magnetization layer 7 of an in-plane magnetization film which is stacked in contact with the read-out layer 1 of the super resolution magneto-optical recording medium (first super resolution magneto-optical recording medium) shown in FIG. 1, wherein the in-plane magnetization layer 7 has a Curie temperature in the vicinity of the critical temperature at which the magnetization state of the read-out layer shifts to perpendicular magnetization (preferably in a temperature range ±15° C. of the critical temperature, more preferably in a temperature range ±5° C. of the critical temperature, and most preferably at the critical temperature).

In the super resolution magneto-optical recording medium of the present embodiment, the in-plane magnetization mask of the read-out layer 1 is reinforced by the exchange coupling between the read-out layer 1 and the in-plane magnetization layer 7 at a temperature below the Curie temperature of the in-plane magnetization layer 7. As a result, it is possible to realize, as with the first super resolution magneto-optical recording medium, high resolution of reproduction, in addition to a stable magneto-static coupling state and accurate recording.

Figure 14:
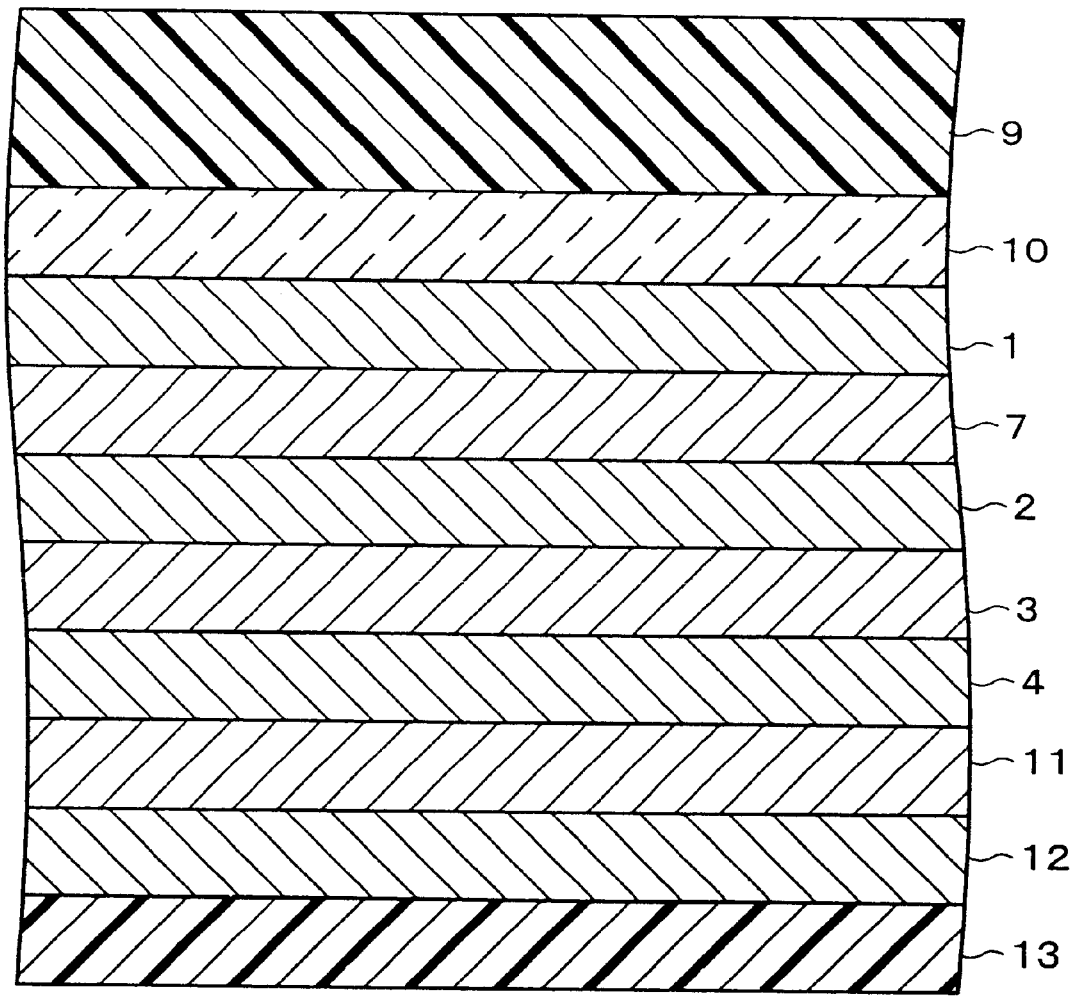
FIG. 14 is a cross sectional view showing a construction of a super resolution magneto-optical disk according to another embodiment of the present invention.

Referring to FIG. 14, the following will explain one application of the super resolution magneto-optical recording medium according to the present embodiment as a magneto-optical disk.

As shown in FIG. 14, the magneto-optical disk (second super resolution magneto-optical disk) according to the present embodiment has a construction in which the in-plane magnetization layer 7 is provided in contact with the read-out layer 1 of the super resolution magneto-optical disk according to the First Embodiment shown in FIG. 6. That is, the super resolution magneto-optical disk according to the present embodiment has a disk main body which includes the substrate 9, the transparent dielectric layer 10, the read-out layer 1, the in-plane magnetization layer 7, the non-magnetic intermediate layer 2, the magnetic flux generating layer 3, the recording layer 4, the protective layer 11, the heat dissipation layer 12, and the overcoat layer 13, which are stacked in this order.

The following describes specific examples of a process for forming the magneto-optical disk having the foregoing construction, i.e., the super resolution magneto-optical disk according to the present embodiment, along with recording and reproducing characteristics of the disk.

EXAMPLE 4

(1) A Process of Forming the Magneto-Optical Disk

The process of Example 1 was used to prepare a super resolution magneto-optical disk which differed from that of Example 1 only with respect to the in-plane magnetization layer 7 of $Gd_{0.13}Fe_{0.87}$ of 15 nm thick between the read-out layer 1 and the non-magnetic intermediate layer 2.

The in-plane magnetization layer 7 was an in-plane magnetization film which had an in-plane magnetization at temperatures of not more than the Curie temperature, which was 140° C. Note that, the magnetic characteristics of the magnetic flux generating layer 3 and the recording layer 4 are as explained in Example 1.

(2) Recording and Reproducing Characteristics

Figure 15:
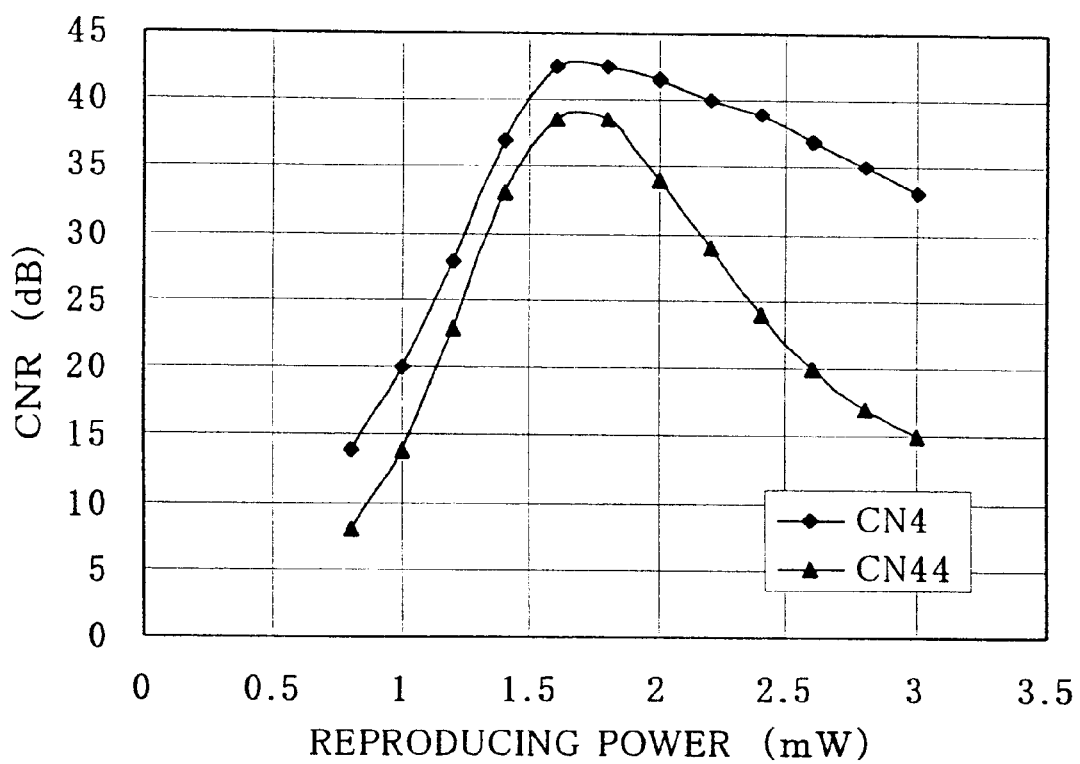
FIG. 15 is a graph showing reproducing power dependence of CNR of super resolution magneto-optical disks of Example 4 and Comparative Example 2.

The test device of Example 1 was used to record recurring magnetic domains of 0.20 μm mark long on the land recording area of the product super resolution magneto-optical disk of Example 4. FIG. 15 shows reproducing power dependence of CNR when these magnetic domains were reproduced. In FIG. 15, CN4 indicates the CNR of this Example 4.

[Comparative Example 2]

(1) A Process of Forming the Magneto-Optical Disk

As in Comparative Example 1, a comparative super resolution magneto-optical disk was prepared by providing a recording layer 6 of $Tb_{0.24}(Fe_{0.85}Co_{0.15})_{0.76}$, 60 nm thick, instead of the magnetic flux generating layer 3 and the recording layer 4 of Example 4.

(2) Recording and Reproducing Characteristics

The test device of Example 1 was used to record recurring magnetic domains of 0.20 μm mark long in the land recording area of the product super resolution magneto-optical disk of this comparative example. FIG. 15 shows reproducing power dependence of CNR when these magnetic domains were reproduced. In FIG. 15, CN44 indicates the CNR of this Comparative Example 2.

According to the foregoing Example 4 and Comparative Example 2, the in-plane magnetization mask of the read-out layer 1 was reinforced by the exchange coupling between the in-plane magnetization layer 7 of a low Curie temperature and the read-out layer 1. As FIG. 8 and FIG. 15 indicate, CN4 (Example 1) and CN44 (Comparative Example 2) have a smaller CNR at a low reproducing power and a larger CNR at an optimum reproducing power than their counterparts CN1 (Example 1) and CN11 (Comparative Example 1), and therefore have improved resolution of reproduction.

Further, by comparing CN4 and CN44, it can be seen that CN4 with the magnetic flux generating layer 3 has a larger CNR in a wider reproducing power range than CN44, as it is in the comparison of CN1 and CN11.

Note that, the foregoing Example 4 described the case where the magnetic flux generating layer 3 is made of TbFeCo as in Example 1. However, the material of the magnetic flux generating layer 3 is not just limited to this example, and it is also possible to use other materials, for example, such as DyFeCo of Example 2 or HoFeCo of Example 3 as explained in the First Embodiment.

The foregoing First and Second Embodiments described the super resolution magneto-optical recording medium provided with the read-out layer 1 which is made of rare earth transition metal alloy of an RE rich composition, having an in-plane magnetization at room temperature and a perpendicular magnetization at higher temperatures of not less than a critical temperature. However, the magnetic flux generating layer 3 and the recording layer 4 of the super resolution magneto-optical recording medium according to the present invention are applicable not only to the super resolution magneto-optical recording medium of RE rich rare earth transition metal alloy which changes its magnetization state from in-plane magnetization to perpendicular magnetization with rise in temperature but also to all types of super resolution magneto-optical recording media in which magnetized information is transferred to the read-out layer 1 by magneto-static coupling. For example, the present invention is applicable to a super resolution magneto-optical recording medium in which the read-out layer of a perpendicular magnetization film is magneto-statically coupled with the magnetic flux generating layer.

In connection with this particular application, the following embodiment describes a super resolution magneto-optical recording medium which employs a perpendicular magnetization film for the read-out layer so that the read-out layer, having a perpendicular magnetization at a predetermined temperature or higher temperatures, is magneto-statically coupled with the magnetic flux generating layer and the recording layer to copy the magnetized information of the recording layer.

[Third Embodiment]

The following will describe yet another embodiment of the present invention with reference to FIG. 1, FIG. 6, and FIG. 16 through FIG. 18. Note that, constituting elements having the same functions as those described in the First Embodiment are given the same reference numerals and explanations thereof are omitted here. Only the differences from the First Embodiment will be explained in the Third Embodiment.

Figure 16:
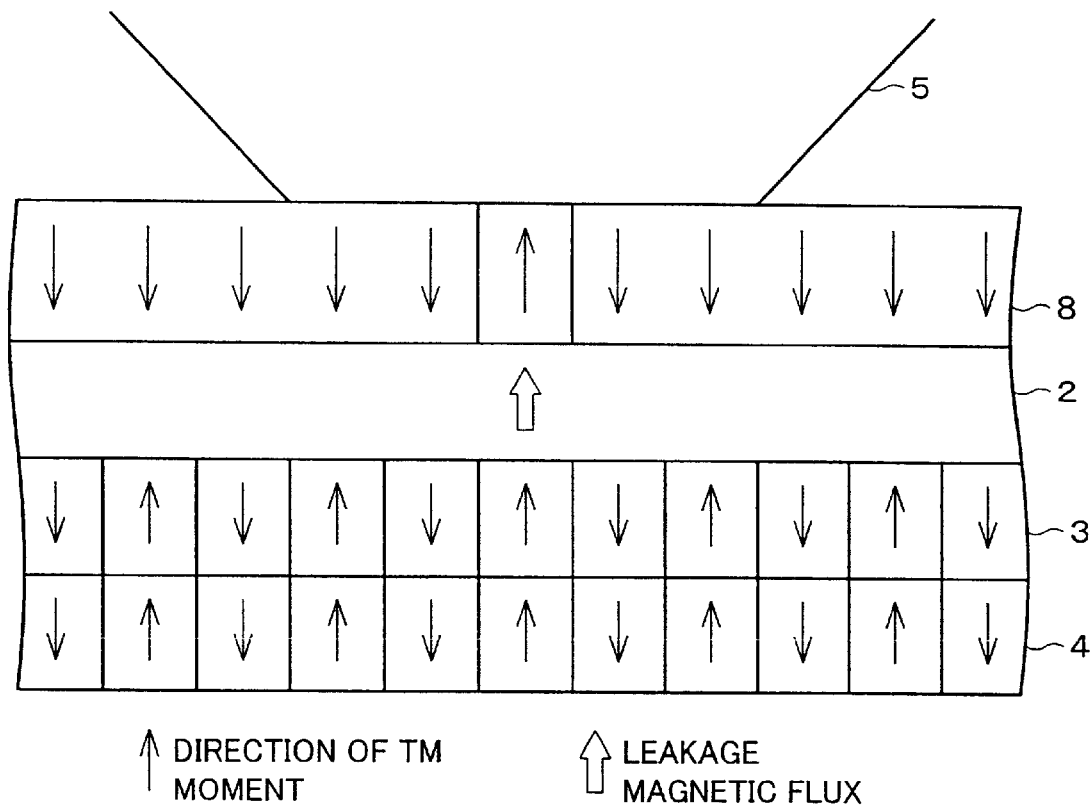
FIG. 16 is an explanatory drawing of a super resolution magneto-optical recording medium according to yet another embodiment of the present invention, in which a magnetized state of the medium is shown in cross section to explain a reproducing principle thereof.

FIG. 16 is a drawing of a super resolution magneto-optical recording medium (third super resolution magneto-optical recording medium) provided as a magneto-optical recording medium according to the present embodiment, in which a magnetized state of the medium is shown in cross section to explain a reproducing principle thereof.

The super resolution magneto-optical recording medium according to the present embodiment includes, as shown in FIG. 16, a read-out layer 8 (read-out magnetic layer), a non-magnetic intermediate layer 2, a magnetic flux generating layer 3, and a recording layer 4 (recording magnetic layer), which are stacked successively in this order.

The read-out layer 8 is a perpendicular magnetization film of rare earth transition metal alloy having a compensation temperature preferably at room temperature. The composition of the read-out layer 8 is so adjusted that the compensation temperature of the read-out layer 8 is in a temperature range of, for example, 0° C. to 50° C., preferably 25° C.±5° C., and most preferably at room temperature.

More specifically, the compensation composition of the read-out layer 8 is such that the RE moment becomes larger than the TM moment, i.e., RE rich composition, where the sub-lattice moment of the RE metal is equal to the sub-lattice moment of the TM metal at a temperature above the compensation temperature. Note that, as in the foregoing First and Second Embodiments, the read-out layer 8 may be composed of, for example, GdFeCo, GdDyFeCo, or GdTbFeCo.

As in the foregoing embodiments, the magnetic flux generating layer 3 and the recording layer 4 are exchange-coupled with each other in an adjacently stacked position, and the read-out layer 8 is magneto-statically coupled with the magnetic flux generating layer 3 and the recording layer 4.

According to this construction of the super resolution magneto-optical recording medium, the magnetized information of the recording layer 4 is transferred to the read-out layer 8 by the magneto-static coupling between the leakage magnetic flux generated from the magnetic flux generating layer 3 and the perpendicular magnetization of the read-out layer 8.

That is, the super resolution magneto-optical recording medium according to the present embodiment has a construction in which the read-out layer 8 of a TM rich composition, having a compensation temperature at around room temperature, is provided instead of the read-out layer 1 of the super resolution magneto-optical recording medium (first super resolution magneto-optical recording medium) shown in FIG. 1. With this construction of the present embodiment, the magneto-static coupling force which acts on the read-out layer 8 can be increased to realize stable transfer of a magnetized state.

Figure 20:
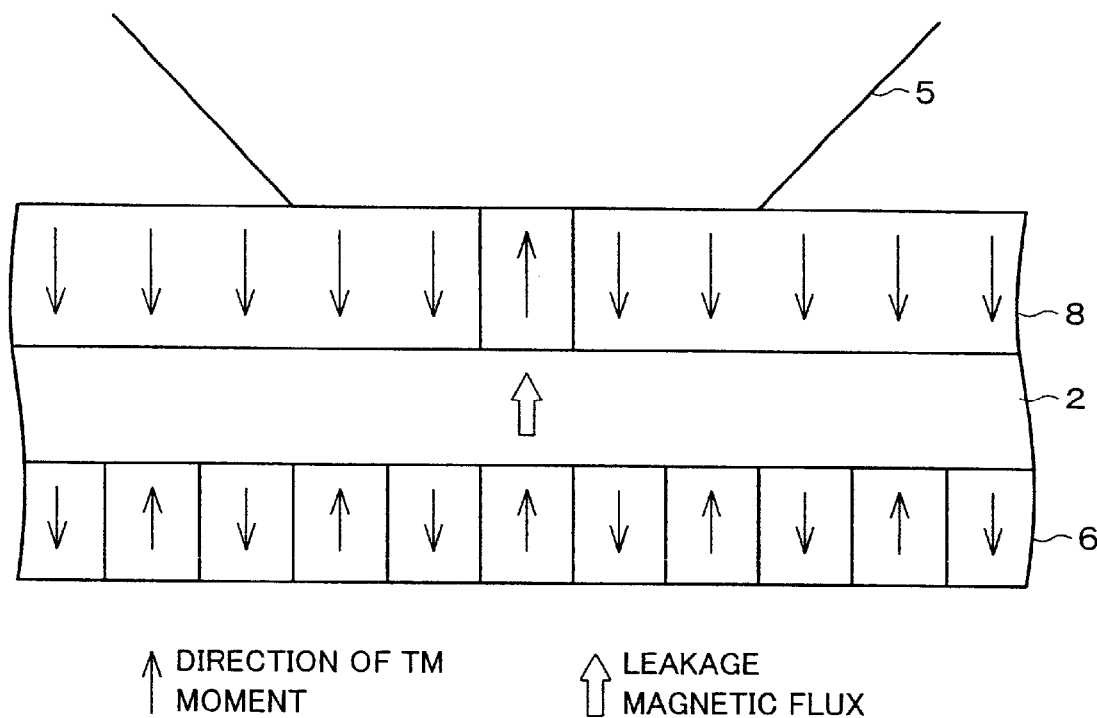
FIG. 20 is an explanatory drawing of a super resolution magneto-optical recording medium of another conventional example, in which a magnetized state of the medium is shown in cross section to explain a reproducing principle thereof.

In contrast, shown in FIG. 20 is a magnetized state in cross section of a super resolution magneto-optical recording medium disclosed in Japanese Unexamined Patent Publication No. 180486/1996 (Tokukaihei 8-180486). This super resolution magneto-optical recording medium is provided with: a read-out layer 8, shown in a perpendicular magnetization state, having a compensation temperature at around room temperature; a non-magnetic intermediate layer 2; and a recording layer 6, shown in a perpendicular magnetization state, having a compensation temperature at around room temperature.

The super resolution magneto-optical recording medium of the foregoing publication realizes super resolution reproduction by the following mechanism. A rise in temperature increases the total magnetizations Ms of the read-out layer 8 and the recording layer 6 to increase the magneto-static coupling force between these two layers. This causes the leakage magnetic flux generated from the recording layer 6 to be magneto-statically coupled with the total magnetization Ms of the read-out layer 8, and as a result the magnetized state of the heated portion of the recording layer 6 is transferred to the read-out layer 8.

Here, because the composition of the read-out layer 8 is TM rich, as shown in FIG. 20, the total magnetization of the read-out layer 8 directs in the same direction as the TM moment in the heated portion which has copied the magnetized state, so that the TM moment and the leakage magnetic flux are in the same direction in the magneto-static coupling.

As with the super resolution magneto-optical recording medium of FIG. 19, the recording layer (recording layer 6 in FIG. 20) of the super resolution magneto-optical recording medium of FIG. 20 has the function of generating the leakage magnetic flux for magneto-static coupling and the function of recording information.

Therefore, it can be seen that, as with the First Embodiment, stable magneto-static coupling and desirable recording characteristics can also be realized in the present embodiment which is provided with the magnetic flux generating layer 3 and the recording layer 4, instead of the recording layer 6, as shown in FIG. 16.

Referring to FIG. 17, the following will explain one application of the super resolution magneto-optical recording medium according to the present embodiment as a magneto-optical disk.

The magneto-optical disk (third super resolution magneto-optical disk) according to the present embodiment has the same construction as the super resolution magneto-optical disk of the First Embodiment shown in FIG. 6, except for the provision of the read-out layer 8 which is provided instead of the read-out layer 1. That is, the super resolution magneto-optical disk according to the present embodiment has a disk main body which includes the substrate 9, the transparent dielectric layer 9, the read-out layer 8, the non-magnetic intermediate layer 2, the magnetic flux generating layer 3, the recording layer 4, the protective layer 11, the heat dissipation layer 12, and the overcoat layer 13, which are stacked in this order.

The following describes specific examples of a process for forming the magneto-optical disk having the foregoing construction, i.e., the super resolution magneto-optical disk according to the present embodiment, along with recording and reproducing characteristics of the disk.

EXAMPLE 5

(1) A Process of Forming the Magneto-Optical Disk

Contrary to Example 1 which realized the magnetic super resolution reproduction by utilizing the transition from in-plane magnetization to perpendicular magnetization in the read-out layer 1 of the composition $Gd_{0.30}(Fe_{0.80}Co_{0.20})_{0.70}$ having a thickness of 40 nm, the present Example 5 used a perpendicular magnetization film having a thickness of 40 nm and a composition of $Gd_{0.25}(Fe_{0.75}Co_{0.25})_{0.75}$ for the read-out layer 8 to prepare a super resolution magneto-optical disk. The read-out layer 8 had a compensation temperature of 25° C. and a Curie temperature of 350° C. The super resolution magneto-optical disk of the present Example 5 is the same as that of Example 1 except for the read-out layer 8 which was provided instead of the read-out layer 1.

(2) Recording and Reproducing Characteristics

Figure 18:
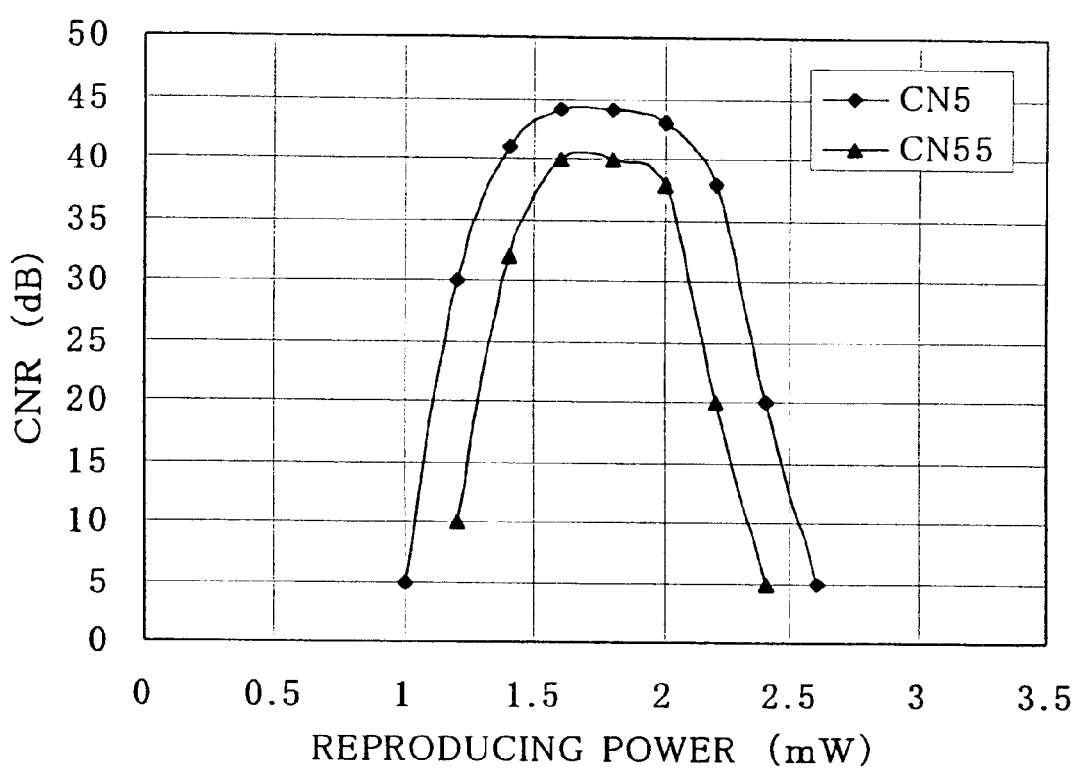
FIG. 18 is a graph showing reproducing power dependence of CNR of super resolution magneto-optical disks of Example 5 and Comparative Example 3.

The test device of Example 1 was used to record recurring magnetic domains of 0.20 μm mark long on the land recording area of the product super resolution magneto-optical disk of this Example. FIG. 18 shows reproducing power dependence of CNR when these magnetic domains were reproduced. In FIG. 18, CN5 indicates the CNR of this Example 5.

[Comparative Example 3]

(1) A Process of Forming the Magneto-Optical Disk

As in Comparative Example 1, a comparative super resolution magneto-optical disk was prepared by providing a recording layer 6 of $Tb_{0.24}(Fe_{0.85}Co_{0.15})_{0.76}$, 60 nm thick, instead of the magnetic flux generating layer 3 and the recording layer 4 of Example 5.

(2) Recording and Reproducing Characteristics

The test device of Example 1 was used to record recurring magnetic domains of 0.20 μm mark long in the land recording area of the product super resolution magneto-optical disk of this comparative example. FIG. 18 shows reproducing power dependence of CNR when these magnetic domains were reproduced. In FIG. 18, CN55 indicates the CNR of this Comparative Example 3.

By comparing CN5 (Example 5) and CN55 (Comparative Example 3), it can be seen that CN5 with the magnetic flux generating layer 3 has a larger CNR in a wider reproducing power range than CN55, as it is in the comparison of CN1 and CN11.

Note that, the foregoing Example 5 described the case where the magnetic flux generating layer 3 is made of TbFeCo as in Example 1. However, the material of the magnetic flux generating layer 3 is not just limited to this example, and it is also possible to use other materials, for example, such as DyFeCo of Example 2 or HoFeCo of Example 3 as explained in the First Embodiment.

According to the present embodiment, with the use of the read-out layer of a perpendicular magnetization film having a compensation temperature at around room temperature, it is possible to provide a super resolution magneto-optical recording medium which can alleviate the adverse effect of cross-light from an adjacent track and realize stable transfer of a magnetized state.

As described, the magneto-optical recording medium according to the present invention, which realizes magnetic super resolution reproduction by magneto-static coupling, is provided with a bi-layered structure composed of (1) the magnetic flux generating layer of a large magnetization to stabilize magneto-static coupling, and (2) the recording layer which produces small cross-light and rapidly loses its coercive force toward the Curie temperature, so as to increase the magneto-static coupling at the magnetic flux generating layer of a low Curie temperature.

To this end, the super resolution magneto-optical recording medium according to the present invention includes: a recording layer, made of a perpendicular magnetization film, in which magnetized information is recorded in the form of a perpendicular direction of magnetization; a magnetic flux generating layer, made of a perpendicular magnetization film, which is exchange-coupled with the recording layer; and a read-out layer, having a perpendicular magnetization at a predetermined temperature or higher temperatures than the predetermined temperature, which copies the magnetized information of the recording layer by magneto-static coupling with the magnetic flux generating layer and the recording layer, wherein the magnetic flux generating layer is a magnetic film having a lower Curie temperature than that of the recording layer, and having a larger total magnetization than that of the recording layer at a temperature at which the read-out layer has a perpendicular magnetization.

The read-out layer may be, for example, a magnetic film of rare earth transition metal alloy which has an in-plane magnetization at room temperature and a perpendicular magnetization at a predetermined temperature or higher temperatures than the predetermined temperature, or a perpendicular magnetization film of rare earth transition metal alloy.

The super resolution magneto-optical recording medium according to the present invention, which utilizes the magneto-static coupling between the read-out layer and the recording layer to copy the magnetized information of the recording layer to the read-out layer, is provided with the magnetic flux generating layer which is exchange-coupled with the recording layer, wherein the read-out layer is magneto-statically coupled with the magnetic flux generating layer and the recording layer. According to this arrangement, the magnetic flux generating layer serves to generate a leakage magnetic flux for magneto-static coupling with the read-out layer, and the recording layer serves to realize desirable recording. Therefore, these two functions, which had been conventionally provided for solely by the recording layer, can be rendered separately to the magnetic flux generating layer which generates a leakage magnetic flux for magneto-static coupling with the read-out layer and the recording layer which record information.

This enables the compensation temperature of the recording layer and thus the coercive force of the recording layer to be increased, so as to alleviate the adverse effect of cross-light from an adjacent track, while ensuring stable transfer of the magnetized information (magnetized state).

In order to reduce cross-light from an adjacent track, the coercive force in the vicinity of the Curie temperature needs to be increased, preferably as much as possible (preferable range is from 50° to 100° C., or higher), by increasing the compensation temperature of the recording layer.

However, since the total magnetization becomes larger as the compensation temperature is increased, the increased compensation temperature reduces the leakage magnetic field which is generated from the recording layer. The result of this is weaker magneto-static coupling between the recording layer and the read-out layer. It was therefore conventionally impossible to reduce cross-light and realize stable transfer of magnetized information satisfactorily at the same time.

In light of this conventional problem, the present invention provides the magnetic flux generating layer of a perpendicular magnetization film which is exchange-coupled with the recording layer of a perpendicular magnetization film, whereby the magnetic flux generating layer and the recording layer are magneto-statically coupled with the read-out layer. In this way, the function of generating a leakage magnetic flux for magneto-static coupling with the read-out layer, which has been conventionally provided for by the recording layer, can be rendered to the magnetic flux generating layer. This makes it possible to increase the compensation temperature of the recording layer (preferably to 50° C. to 100° C. or higher) and thus the coercive force of the recording layer, so as to alleviate the adverse effect of cross-light from an adjacent track. In addition, the magnetic flux generating layer can have a larger total magnetization than the recording layer at temperatures at which the read-out layer has a perpendicular magnetization, and therefore the magnetic flux generating layer can generate a larger magnetic flux. As a result, the magnetic-coupling force which acts on the read-out layer can be increased to realize stable transfer of magnetized information.

However, what should be noted here is that when the Curie temperature of the magnetic flux generating layer is higher than that of the recording layer, the magnetic flux generating layer, not the recording layer, determines the recording operations because of its higher Curie temperature. Information cannot be accurately recorded in this case because the magnetic flux generating layer loses its coercive force gradually toward the Curie temperature due to its property according to the foregoing relationship with the recording layer, in that the relative low compensation temperature to obtain a large magnetic flux is lower than that of the recording layer so as to obtain a larger total magnetization than the recording layer. Inversely, according to the foregoing relationship with the magnetic flux generating layer, the recording layer has a relatively higher compensation temperature than the magnetic flux generating layer. It is therefore required that the magnetic flux generating layer has a lower Curie temperature than the recording layer.

With the magneto-optical recording medium having the foregoing arrangement according to the present invention, the compensation temperature of the recording layer and therefore the coercive force of the recording layer can be increased to alleviate the adverse effect of cross-light from an adjacent track, while ensuring stable and accurate transfer of magnetized information (magnetized state).

Here, with the use of the read-out layer made of a magnetic layer of rare earth transition metal alloy which has an in-plane magnetization at room temperature and a perpendicular magnetization at a predetermined temperature or higher temperature than the predetermined temperature, the magneto-optical recording medium which is operable to reproduce magnetized information only from a portion of the read-out layer which has shifted to perpendicular magnetization can be used to alleviate the adverse effect of cross-light from an adjacent track and to generate a larger magnetic flux from the magnetic flux generating layer having a larger total magnetization than that of the recording layer. As a result, the magneto-coupling force on the read-out layer can be increased and stable transfer of magnetized information can be realized.

Further, by the provision of the in-plane magnetization layer, in contact with the read-out layer, having a Curie temperature in the vicinity of a temperature at which the read-out layer shifts to perpendicular magnetization, it is possible to improve resolution of reproduction of the magneto-optical recording medium, thus realizing higher density recording and reproducing.

Further, by the read-out layer made of a perpendicular magnetization film of rare earth transition metal alloy, it is possible to alleviate the adverse effect of cross-light from an adjacent track and to increase the magneto-static coupling force on the read-out layer, thereby providing the super resolution magneto-static recording medium which can stably copy a magnetized state.

Further, the magnetic characteristics required in the present invention can be readily realized by suitably adjusting the composition of the magnetic materials of the read-out layer, the recording layer, and the magnetic flux generating layer. For example, the read-out layer may be composed of GdFeCo, the recording layer may be composed of TbFeCo, and the magnetic flux generating layer may be composed of a material selected from the group consisting of TbFeCo, DyFeCo, and HoFeCo.

Further, by the provision of the non-magnetic intermediate layer between the read-out layer and the magnetic flux generating layer, the read-out layer is magneto-statically coupled with the magnetic flux generating layer and the recording layer via the non-magnetic intermediate layer. According to this arrangement, the non-magnetic intermediate layer enables the read-out layer to be stably coupled with the magnetic flux generating layer and the recording layer by magneto-static coupling, thereby realizing stable magnetic super resolution reproduction.

Further, the magneto-optical recording medium may have an arrangement including at least the read-out layer, the magnetic flux generating layer of a perpendicular magnetization film, and the recording layer of a perpendicular magnetization film, wherein the magnetic flux generating layer and the recording layer are exchange-coupled, the read-out layer is magneto-statically coupled with the magnetic flux generating layer and the recording layer, and the magnetic flux generating layer is a magnetic layer with a lower Curie temperature than that of the recording layer and with a large peak value of total magnetization at a temperature at or above room temperature.

As a result, it is possible to alleviate the adverse effect of cross-light from an adjacent track, and to increase the magneto-static coupling force on the read-out layer by a larger leakage magnetic flux generated from the magnetic flux generating layer having a larger total magnetization than that of the recording layer, thus realizing accurate and stable transfer of magnetized information.

With the magneto-optical recording medium according to the present invention, it is possible to increase a power margin when a smaller magnetic domains are recorded on the recording layer, i.e., a reproducing power margin of a high-density magneto-optical recording medium, and to reduce cross-light.

Further, according to the present invention, in the magneto-optical recording medium in which the read-out layer and the recording layer are magneto-statically coupled, the provision of the magnetic flux generating layer stacked on the recording layer can increase the magneto-static coupling force between the read-out layer and the recording layer, so as to improve recording and reproducing characteristics of shorter marks, particularly of super resolution magneto-optical disks (e.g., IDs).

As described, with the present invention, the adverse effect of cross-light from an adjacent track can be alleviated and stable transfer of magnetized information can be realized.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium, comprising:
   a recording layer, made of a perpendicular magnetization film, in which magnetized information is recorded in the form of a perpendicular direction of magnetization;
   a magnetic flux generating layer, made of a perpendicular magnetization film, which is exchange-coupled with the recording layer; and
   a read-out layer, having a perpendicular magnetization at a predetermined temperature or higher temperatures than the predetermined temperature, which copies the magnetized information of the recording layer by magneto-static coupling with the magnetic flux generating layer and the recording layer,
   wherein the magnetic flux generating layer is a magnetic layer having a lower Curie temperature than that of the recording layer and having a larger total magnetization than that of the recording layer at a temperature at which the read-out layer has a perpendicular magnetization.

2. The magneto-optical recording medium as set forth in claim 1, wherein the read-out layer is a magnetic layer of rare earth transition metal alloy which has an in-plane magnetization at room temperature and a perpendicular magnetization at a predetermined temperature or higher temperatures than the predetermined temperature.

3. The magneto-optical recording medium as set forth in claim 1, comprising:
   an in-plane magnetization layer, provided in contact with the read-out layer, having a Curie temperature in the vicinity of a temperature at which the read-out layer shifts to perpendicular magnetization.

4. The magneto-optical recording medium as set forth in claim 3, further comprising:
   a non-magnetic intermediate layer between the read-out layer and the magnetic flux generating layer.

5. The magneto-optical recording medium as set forth in claim 4, wherein the read-out layer, the in-plane magnetization layer, the non-magnetic intermediate layer, the magnetic flux generating layer, and the recording layer are provided in this order.

6. The magneto-optical recording medium as set forth in claim 1, wherein the read-out layer is a perpendicular magnetization film of rare earth transition metal alloy.

7. The magneto-optical recording medium as set forth in claim 1, wherein:
   the read-out layer is composed of GdFeCo,
   the recording layer is composed of TbFeCo, and
   the magnetic flux generating layer is composed of a material selected from the group consisting of TbFeCo, DyFeCo, and HoFeCo.

8. The magneto-optical recording medium as set forth in claim 1, wherein the magnetic flux generating layer and the read-out layer are separated from each other by a distance of not more than 60 nm.

9. The magneto-optical recording medium as set forth in claim 1, comprising a non-magnetic intermediate layer between the read-out layer and the magnetic flux generating layer.

10. The magneto-optical recording medium as set forth in claim 9, wherein the read-out layer, the non-magnetic intermediate layer, the magnetic flux generating layer, and the recording layer are stacked in this order.

11. The magneto-optical recording medium as set forth in claim 9, wherein:
    the read-out layer, the non-magnetic intermediate layer, and the magnetic flux generating layer are stacked in adjacence, wherein the non-magnetic intermediate layer has a thickness in a range of from 0.5 nm to 60 nm, inclusive.

12. The magneto-optical recording medium as set forth in claim 1, wherein the read-out layer has a perpendicular magnetization in a temperature range of from 100° C. to 200° C., inclusive.

13. The magneto-optical recording medium as set forth in claim 1, wherein the magnetic flux generating layer has a lower compensation temperature than the recording layer.

14. The magneto-optical recording layer as set forth in claim 1, wherein a composition of the magnetic flux generating layer is adjusted to have a larger total magnetization than that of the recording layer in a temperature range of from a critical temperature at which the read-out layer shifts to perpendicular magnetization to a temperature 50° C. higher than the critical temperature.

15. The magneto-optical recording layer as set forth in claim 1, wherein a composition of the magnetic flux generating layer is so adjusted that a peak value of total magnetization of the magnetic flux generating layer is larger than a peak value of total magnetization of the recording layer.

16. The magneto-optical recording medium as set forth in claim 1, wherein the magnetic flux generating layer has a thickness in a range of from 20 nm to 80 nm, inclusive.

17. The magneto-optical recording medium as set forth in claim 1, wherein the recording layer is a perpendicular magnetization film of rare earth transition metal alloy having a compensation temperature in a temperature range of from 50° C. to 150° C., inclusive.

18. The magneto-optical recording medium as set forth in claim 1, wherein the recording layer is a perpendicular magnetization film of rare earth transition metal alloy having a Curie temperature in a temperature range of from 230° C. to 280° C., inclusive.

19. The magneto-optical recording medium as set forth in claim 1, wherein a composition of the read-out layer is adjusted to have a compensation temperature in a temperature range of from 0° C. to 50° C., inclusive.

20. The magneto-optical recording medium as set forth in claim 1, wherein the magnetic flux generating layer is a magnetic layer with a large peak value of total magnetization at a temperature at or above room temperature.

* * * * *